US006669243B2

United States Patent
Katoh et al.

(10) Patent No.: US 6,669,243 B2
(45) Date of Patent: Dec. 30, 2003

(54) SIDE LOCK ASSEMBLY FOR STORAGE BIN

(75) Inventors: Kouichi Katoh, Kanagawa-ken (JP); Noboru Niikura, Kanagawa-ken (JP)

(73) Assignees: Piolax Inc., Kanagawa-ken (JP); Kanto Auto Works, Ltd., Kanagawa-ken (JP)

( * ) Notice: Subject to any disclaimer, the term of this patent is extended or adjusted under 35 U.S.C. 154(b) by 0 days.

(21) Appl. No.: 10/186,612

(22) Filed: Jul. 2, 2002

(65) Prior Publication Data
US 2003/0006616 A1 Jan. 9, 2003

(30) Foreign Application Priority Data

Jul. 3, 2001 (JP) ................................. P-2001-201800
Jul. 3, 2001 (JP) ................................. P-2001-201914

(51) Int. Cl.$^7$ .............................................. E05C 1/06
(52) U.S. Cl. ............................ 292/34; 292/DIG. 37; 296/37.8
(58) Field of Search .......................... 292/34, 37, 41, 292/165, 169, 170, DIG. 37; 220/324, 326, 521; 296/37.8, 37.9, 37.12, 37.13

(56) References Cited

U.S. PATENT DOCUMENTS

| 1,344,048 A | | 6/1920 | Lombardo | |
|---|---|---|---|---|
| 1,346,677 A | | 7/1920 | Porter | |
| 2,088,665 A | * | 8/1937 | Pinson | |
| 2,325,809 A | * | 8/1943 | Stephansko | 220/87 |
| 3,596,952 A | * | 8/1971 | Hinkle | 292/27 |
| 4,538,844 A | * | 9/1985 | Watanabe | 292/127 |
| 4,781,407 A | | 11/1988 | Rauchhaus | |
| 5,688,000 A | * | 11/1997 | Dolman | 292/34 |
| 5,820,175 A | * | 10/1998 | Clavin | 292/165 |
| 6,076,878 A | * | 6/2000 | Isano | 296/37.12 |
| 6,120,069 A | * | 9/2000 | Taranto | 292/35 |
| 6,152,512 A | * | 11/2000 | Brown | 296/37.12 |
| 6,435,572 B1 | * | 8/2002 | Ticu | 292/175 |
| 6,435,587 B1 | * | 8/2002 | Flowerday | 296/37.8 |

FOREIGN PATENT DOCUMENTS

| GB | 2130291 | 5/1984 |
|---|---|---|
| JP | 4060079 | 2/1992 |

OTHER PUBLICATIONS

English Language Abstract for JP Appln. No. 4060079.

* cited by examiner

Primary Examiner—Gary Estremsky
(74) Attorney, Agent, or Firm—Greenblum & Bernstein, P.L.C.

(57) ABSTRACT

A storage bin side lock assembly is disclosed including a storage bin B mounted to a support body P for an opening and closing capability, with the storage bin B being attached with a housing 8, 70 encompassing a pair of right and left latches 5, 5, 40, 40 which are biased toward lock apertures Pa, Pa formed in the support body P by a spring member 6, 6, 50, 50 and distal ends of which are retracted from the lock apertures of the support body against the biasing force of the spring member responsive to pivotal operation of an operating handle 3, 30. Pivotal operation of the operating handle is converted to lateral motions of the latches 5, 5, 40, 40 which are consequently retracted in an unlocked condition.

16 Claims, 17 Drawing Sheets

SIDE LOCK ASSEMBLY FOR STORAGE BIN

BACKGROUND OF THE INVENTION

1. Field of the Invention

The present invention relates to a side lock assembly for a storage bin such as a glove box adapted, to be mounted to a vehicle instrument panel for a opening and closing capability.

2. Description of the Related Art

A side lock assembly of the type set forth above is disclosed in Japanese Patent Provisional Publication No. 4-60079. This side lock assembly is structured with a pair of right and left link levers pivotally mounted to a housing fixedly mounted in a glove box, a pair of latches connected to upper distal ends of the respective right and left link levers for protruding and retracting movements through associated lock apertures formed in an instrument panel, and a compression spring connected to lower end portions of the respective right and left link levers for biasing the above-described latches such that they engage the lock apertures at all times.

And, when the glove box remains in a closed condition, the distal ends of the latches formed at the upper end portions of the respective right and left link levers remain in engagement with the associated right and left lock apertures of the instrument panel, thereby locking the glove box in its closed position. In order for such a locked condition to be released for thereby unlocking the glove box, pivotally operating an operating handle compels opposing protruding arms, which are formed intermediate the pair of respective link levers, to be moved downward against the biasing force of the compression spring, causing the right and left link levers to rotate in a direction opposite to the biasing force of the compression spring to allow the distal ends of the latches to be retracted from the associated lock apertures. This enables the glove box to be shifted in an opening direction.

SUMMARY OF THE INVENTION

Accordingly, the side lock assembly set forth above affords an advantage of simply achieving locking and unlocking operations at both sides of the glove box. However, in contrast, when there is a need for altering the amount of protruding or retracting movements at both right and left sides due to particular design changes in shape of the glove box or the instrument panel, not only the length of the latches but also the sizes of the link levers and the housing must be altered. This results in fear of a limitation in space for accommodating the glove box per se.

The present invention has been completed to effectively address the above issues. According to a first aspect of the present invention, there is provided a side lock assembly for locking a storage bin to a support body, comprising: a support body; a storage bin received in the support body, and an opening and closing mechanism operatively mounted on the storage bin for operating the storage bin in a locked position and an unlocked position relative to the support body The opening and closing mechanism includes, an operating member pivotally mounted on the storage bin to move selectively between the locked position and the unlocked position; a rotatable connecting member integrally rotatable with the operating member to move selectively between the locked position and the unlocked position; a latch member engaged to or disengaged from the support body through the storage bin, the latch member being movable inward along a rotational axis of the rotatable connecting member and normally biased outward to lock the storage bin to the support body in the locked position; and a latch release member having one element connected to the latch member and another element connected to the rotatable connecting member, to apply an axial force to the latch member, the latch release member being operative to move the latch member inward along the rotational axis against the axial force to disengage the latch member from the support body in the unlocked position in response to an unlocking external force applied to the operating member.

With the structure of the first aspect of the present invention, the presence of the rotatable connecting member integrally movable with the operating member allows the latch member to be connected to the rotatable connecting member in a simplified structure with a minimal number of components, thereby permitting the latch member to be movable along a rotational axis of the rotatable connecting member between the closed or locked position and the open or unlocked position. This provides an ease of design change in the support body or the storage bin without any remarkable change in structure of the opening and closing mechanism. This is achieved by replacement of the latch member to provide desired amounts of protrusions along the rotational axis of the rotatable connecting member required for a particular support body or a particular storage bin.

According to a second aspect of the present invention, there is provided a side lock assembly for locking a storage bin to a support body, comprising: a support body having a pair of lock apertures; a storage bin received in the support body; and an opening and closing mechanism operatively mounted on the storage bin for operating the storage bin in a locked position and an unlocked position relative to the support body, The opening and closing mechanism includes an operating handle pivotally mounted on the storage bin to move selectively between the locked position and the unlocked position; a rotatable connecting bar integrally rotatable with the operating handle to move selectively between the locked position and the unlocked position; a pair of latches connected to opposing ends of the rotatable connecting bar for integral rotation therewith, the pair of latches being movable inward along a rotational axis of the rotatable connecting bar; at least one spring member normally biasing the pair of latches toward the lock apertures of the support body along the rotational axis of the rotatable connecting bar to lock the storage bin to the support body in the locked position; and a latch release member including a cam member connected to at least one of the pair of latches, the cam member being normally inoperative to allow the spring member to bias the pair of latches toward the lock apertures of the support body and operative to move the pair of latches inward along the rotational axis of the rotatable connecting bar against the biasing force of the spring member to disengage the pair of latches from the support body in the unlocked position in response to an external unlocking force applied to the operating handle.

With the structure of the second aspect of the present invention, the presence of the rotatable connecting bar integrally movable with the operating handle allows the pair of latches to be connected to the rotatable connecting bar in a simplified structure with a minimal number of components, thereby permitting the pair of latches to be movable along a rotational axis of the rotatable connecting bar between the closed or locked position and the open or unlocked position. This provides an ease of design change in the support body or the storage bin without any remarkable change in structure of the opening and closing mechanism.

This is achieved by a pair of newly replaced latches to provide desired amounts of protrusions along the rotational axis of the rotatable connecting bar, i.e. in a lateral direction, required for a particular support body or a particular storage bin without the need for replacement of the housing encompassing the rotatable connecting bar, the pair of latches and the latch release member.

According to a third aspect of the present invention, there is provided a side lock assembly for locking a storage bin to a support body, comprising: a support body having a pair of lock apertures; a storage bin received in the support body for a closed condition and an opened condition; and an opening and closing mechanism operatively mounted to the storage bin for operating the storage bin in a locked position and an unlocked position relative to the support body to permit the storage bin to be actuated in the closed condition and the opened condition, respectively. The opening and closing mechanism includes: an operating handle disposed in the storage bin and operative to actuate the opening and closing mechanism in the unlocked position; a rotatable member integrally movable with the operating handle and operative to move selectively between the locked position and the unlocked position; a pair of latches connected to the rotatable member for sliding movements along a rotational axis of the rotatable member; at least one spring member cooperating with the rotatable member to normally bias the pair of latches outward to cause the same to engage the lock apertures of the support body in the locked position; and a latch release member including a cam member cooperating with the pair of latches and the rotatable member, the cam member being normally inoperative to allow the spring member to bias the pair of latches toward the lock apertures of the support body and operative to move the pair of latches inward along the rotational axis of the rotatable member against the biasing force of the spring member to disengage the pair of latches from the support body in the unlocked position in response to an external unlocking force applied to the operating handle.

With the structure of the third aspect of the present invention, the presence of the latch release member including a cam member cooperating with the pair of latches and the rotatable member allows the pair of latches to be connected to the rotatable member in a simplified structure with a minimal number of components, thereby permitting the pair of latches to be movable along a rotational axis of the rotatable member between the closed or locked position and the open or unlocked position. This provides an ease of design change in the support body or the storage bin without any remarkable change in structure of the opening and closing mechanism. This is achieved by newly replaced cam member with an alternative cam recess and a pair of newly replaced latches with alternative length of travels along the rotational axis of the rotatable shah required for a particular support body or a particular storage bin without the need for replacement of the housing encompassing the rotatable member, the pair of latches and the latch release member.

DETAILED DESCRIPTION OF THE PREFERRED EMBODIMENTS

Preferred embodiments illustrative of the present invention are described hereinafter in detail. Side lock devices of the preferred embodiments, which will be described below, are aimed to be applied to a storage bin such as a glove box which is mounted to an instrument panel of a vehicle for closing and opening capabilities, wherein a glove box body presupposes that it is pivotally mounted in a cavity of the instrument panel for pivotal movements.

First Preferred Embodiment

Figure 1:
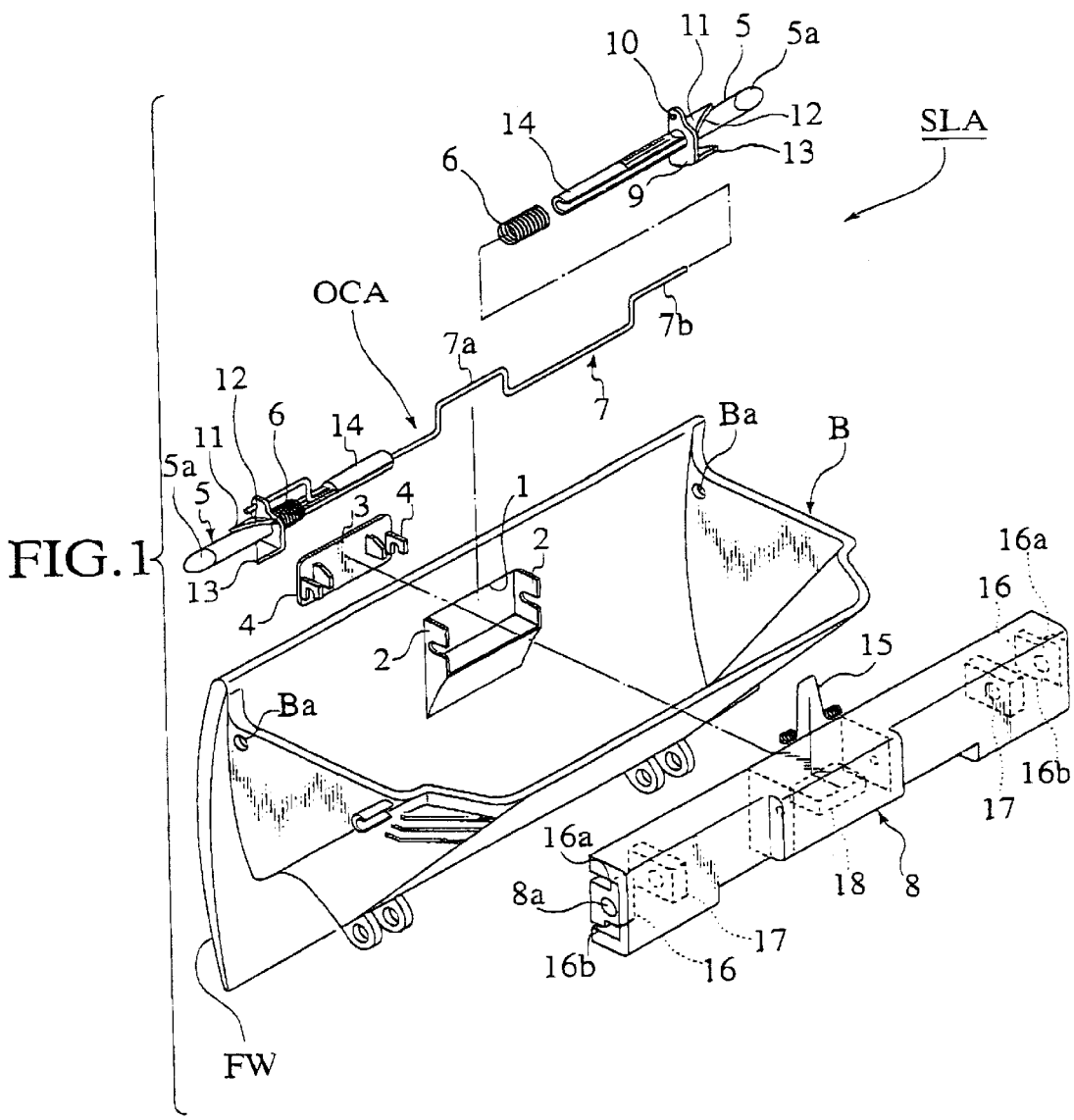
FIG. 1 is an exploded perspective view of a side lock assembly of a first preferred embodiment according to the present invention.

Referring now to FIG. 1, there is shown a side lock assembly SLA for a storage bin of a first preferred embodiment of the present invention, with the storage bin being exemplarily shown as including a glove box body B adapted to be mounted in an instrument panel (not shown) of a vehicle. The glove box body B is shown having a central portion formed with a through-bore 1, which has lateral opposing edges formed with inwardly extending shaft receptor segments 2, 2, in which an operating handle 3, serving as an operating member to move selectively between a locked position and an unlocked position, is inserted from a front wall FW and is pivotally supported by means of a rotatable connecting bar 7, which serves as a rotatable connecting member and forms part of an opening and closing mechanism OCA for operating the storage bin between the locked position and the unlocked position, for pivotal movements as will be described below. Further, the glove box body B is equipped with a latch member including a pair of right and left latches 5, 5 which are connected to the rotatable connecting member 7 for integral rotation therewith such that the latches are movable inward along a rotational axis of the rotatable connecting member 7 and normally biased outward to lock the storage bin to the support body, by means of compression springs 6, 6. A housing 8 is integrally fixed to an inner side of the front wall FW by means of screws (not shown) to encompass the rotatable connecting bar 7 and the right and left latches 5, 5 connected thereto for free movements of these components. Also, opposing engagement elements 4, 4 are formed at a rear surface of the operating handle 3 to engage the rotatable connecting bar 7.

In the preferred and illustrated embodiment, each latch 5 is symmetrical in nature relative to one another. In view of the symmetrical nature of the latch 5 and for a simplified description, a single latch will be described below in detail. The latch 5 is made of plastic resin in a unitary structure and, as shown, the latch 5 includes a bar shaped portion with a forward end formed with a cam element composed of a tapered portion 5a and a rearward end formed with an enlarged flange 9 which has an engagement aperture 10 for receiving a distal end 7b of the rotatable connecting bar 7. In addition, the latch 5 includes an actuating segment 11 which extends outward from an upper area of an outer surface of the enlarged flange 9 and is integrally formed with a sloped cam surface 12, forming a cam element of a latch release member, that remains in contact with an upper cut-out portion, forming another cam element of the latch release member, of a first block 16 of the housing 8, and a stopper segment 13 which extends outward from a lower edge of the outer surface of the enlarged flange 9 and which abuts a lower cut-out portion 16b of the first block 16 of the housing 8. The latch release member is associated with the rotatable connecting 7 to normally apply an axial force to the latches 5, 5 to cause the same to engage the support body through the storage bin in the locked position and operative to move the latches 5, 5 inward along the rotational axis of the rotatable connecting bar 7 against an axial force exerted with the compression spring 6 to disengage the latches 5, 5 from the support body in the unlocked position in response to an unlocking external force applied to the operating handle 3. Further, formed at an inside wall of the enlarged flange 9 is a guide sleeve 14 which is C-shaped in cross section and which supports a midway portion of the rotatable connecting bar 7 such that it is biased toward a lock aperture formed in the instrument panel (the support body) with the biasing force of the above-described compression spring 6. Also, with each compression spring 6 being received on the associated guide sleeve 14, the compression springs 6, 6 are mounted in the first block 16 and a second block 17 of the housing 8, respectively.

The rotatable connecting bar 7 is made of steel wire, with a portion of a central portion 7a being continuously bent upward while both end portions 7b are also continuously bent upward. The bent central portion 7a engages at its both ends with the engagement segments 4, 4 of the operating handle 3 while abutting the rear surface of the operating handle 3. Further, the distal ends of both bent end portions engage the engagement apertures 10, 10 of the opposing enlarged flanges 9, 9, respectively The rotatable connecting bar 7 is arranged to bias the operating handle 3 toward the locked position, and the operating handle 3 is pivotally supported in the storage bin for pivotal movements, with no looseness in its inoperative condition by the biasing force of a double torsion spring 15 which is secured to a third block 18 of the housing 8 which is described below in detail.

Figure 2:
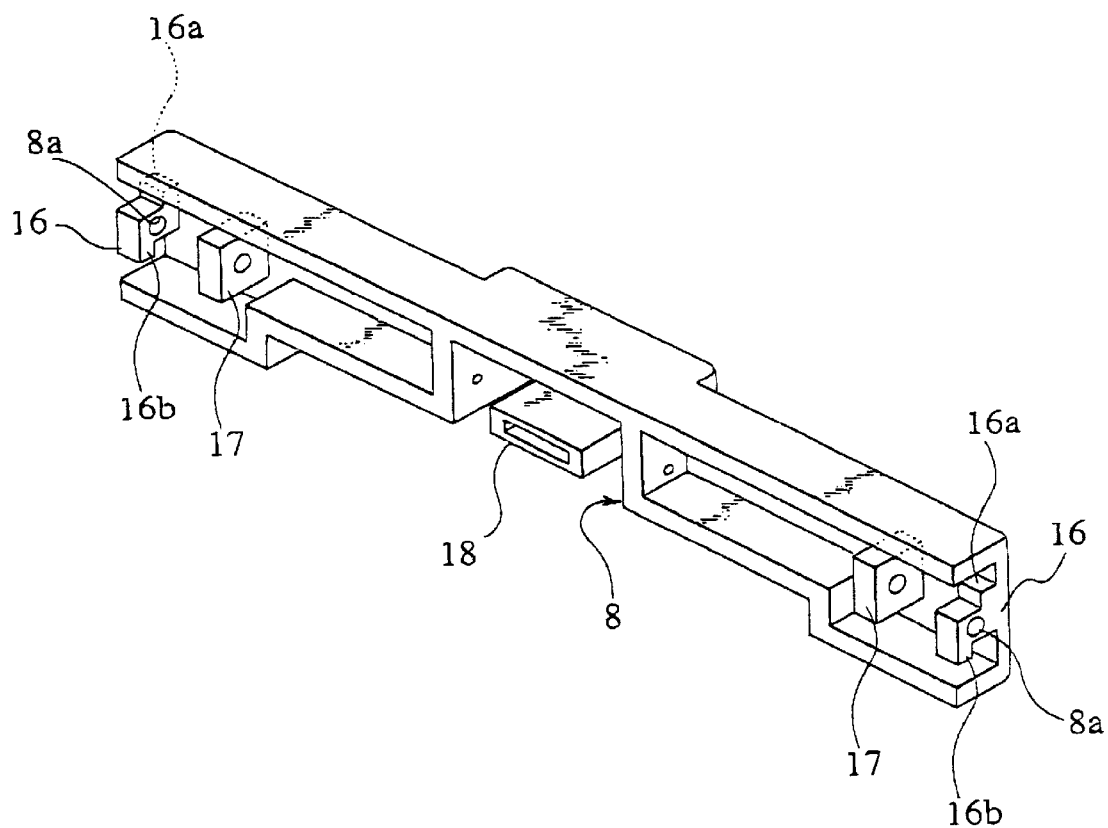
FIG. 2 is a perspective view illustrating an interior of a housing shown in FIG. 1

The housing 8 is formed of plastic resin in a unitary structure to remain in symmetrical in nature relative to right and left portions and, as shown in FIG. 2, the third block 18 lies in a central portion of the housing 8 to allow the above-described double torsion spring 15 to be mounted thereto while the opposing first and second blocks 16, 17 are located at both ends of the housing 8 to be separate from one another in a given length Mounted to the first and second blocks 16, 17 are the compression springs 6, 6 which are disposed on the associated guide sleeves 14, 14 of the respective latches 5, 5. Especially, each block 16 is arranged such that the upper cut-out portion 16a remains in contact with the sloped cam surface 12 formed on the actuating segment 11 of each above-described latch 5. The handle 3 is arranged to be operated in a limited movable range during rotation of each latch 5, caused by pivotal operation of the operating handle 3 due to the external unlocking force exerted thereto, by compelling the distal end of each latch 5 to be retracted from the associated lock aperture formed in the instrument panel while permitting the above-described stopper segment 13 to abut the lower cut-out portion 16b.

Figure 3:
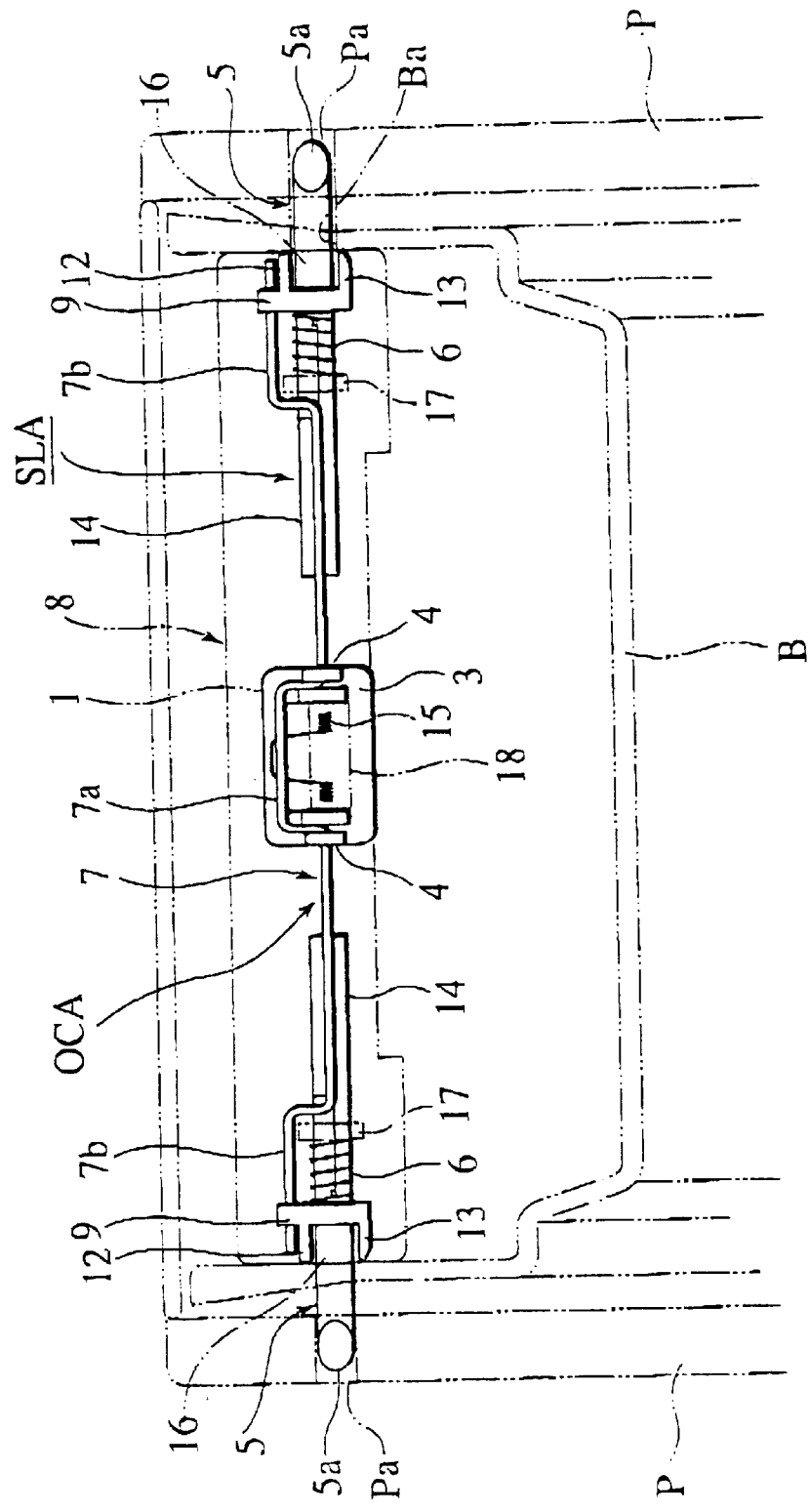
FIG. 3 is a view illustrating a glove box body which remains in a closed, locked condition with the side lock assembly shown in FIG. 1.
Figure 4:
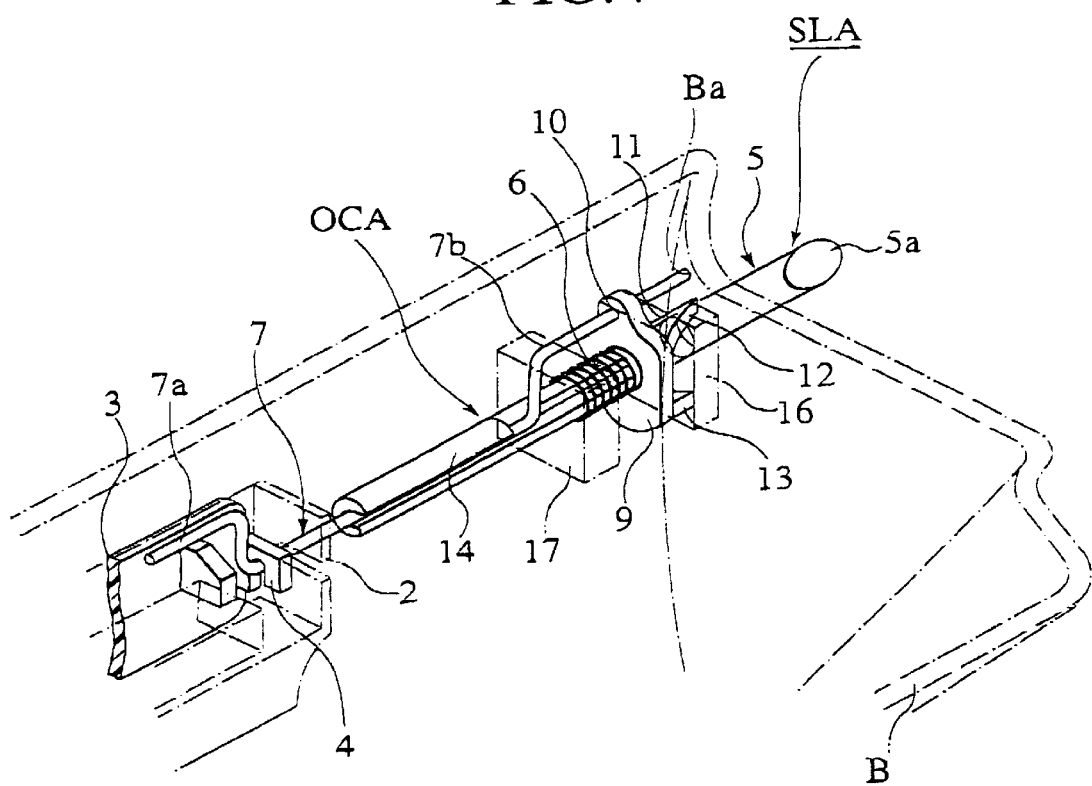
FIG. 4 is a perspective view illustrating an essential part of the glove box body which remains in a closed, locked condition with the side lock assembly shown in FIG. 1.

With such a structure of the side lock assembly, accordingly, in a case where the glove box body (storage bin) B remains in its closed, locked condition, as shown in FIGS. 3 and 4, the opposing distal ends of the pair of right and left latches 5, 5 engage opposing side apertures 8a, 8a (see FIGS. 1 and 2) of the housing 8 and opposing through-holes Ba, Ba formed at opposing side walls of the glove box body B, and finally engage the associated lock apertures Pa, Pa of the instrument panel P to lock the glove box body B to the instrument panel P due to the biasing forces of the compression springs 6, 6.

Figure 5:
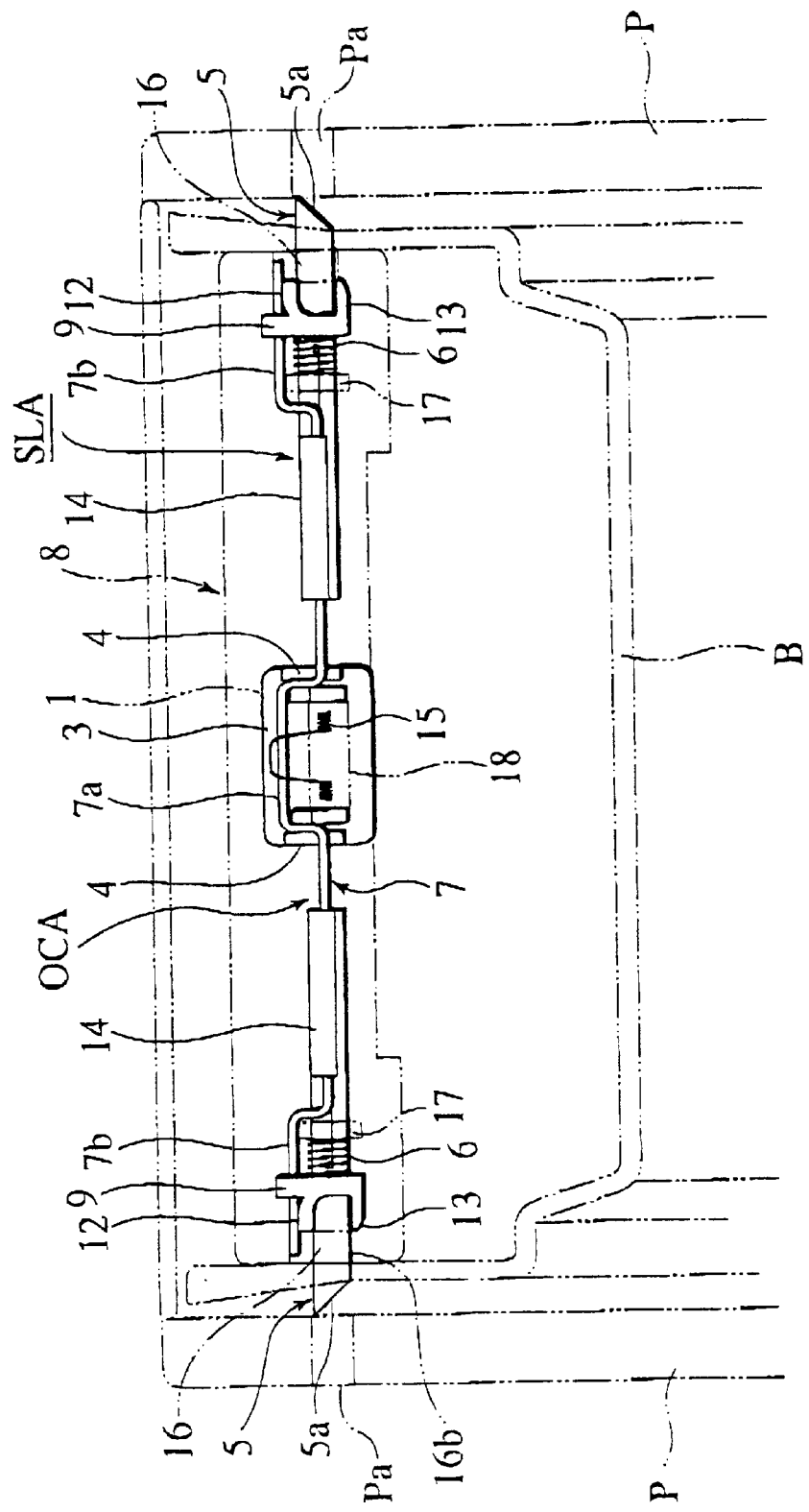
FIG. 5 is a perspective view illustrating the glove box body which remains in an unlocked condition with the side lock assembly shown in FIG. 1.
Figure 6:
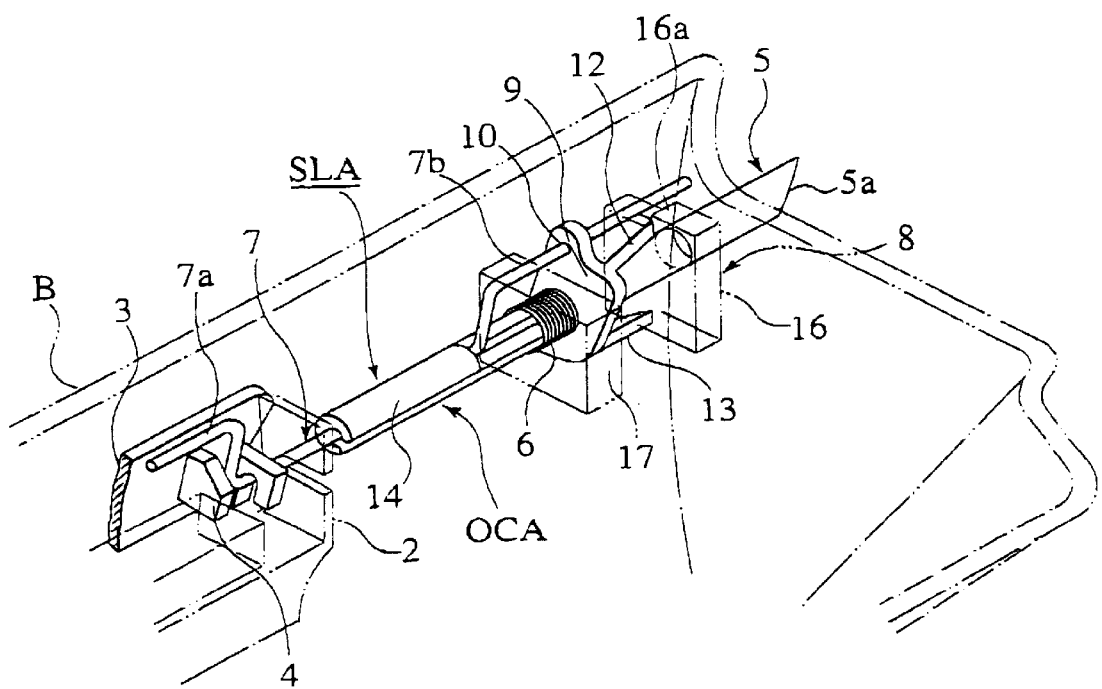
FIG. 6 is a perspective view illustrating an essential part of the glove box body which remains in the unlocked condition with the side lock assembly shown in FIG. 1.

As shown in FIGS. 5 and 6, in order for the locked glove box body B to be released in the unlocked direction, applying an external releasing force to pivotally rotate the operating handle 3 against the biasing force of the double torsion spring 15 leads an accompanied rotation of the rotatable connecting bar 7. As a result of this rotation, the right and left latches 5, 5, which are slidably supported by the distal ends of the rotatable connecting bar 7 by means of the engagement apertures 10, 10 of the respective enlarged flanges 9, 9, are caused to rotate in the same direction until the stopper segments 13, 13 abut the associated lower cut-out portions 16b, 16b. When this takes place, the sloped cam surfaces 12, 12 of the actuating segments 11, 11 of the respective right and left latches 5, 5 are brought into sliding contact with the associated upper cut-out portions 16a, 16a of the first and second blocks 16, 16 of the housing 8, causing the right and left latches 5, 5 to be forcibly retracted along the rotational axis of the rotatable connecting bar 7 against the biasing forces of the compression springs 6, 6.

Then, as a result of respective right and left latches 5, 5 being forcibly retracted, the distal ends of the right and left latches 5, 5 are also caused to retract from the associated lock apertures Pa, Pa of the instrument panel P. Subsequently, the glove box body B is permitted to automatically rotate to its opened, unlocked position. If the operating handle 3 is released after the glove box body B has been rotated to its released position, the rotatable connecting bar 7 is rotated in a reverse direction by the biasing forces of the compression springs 6, 6 to compel the operating handle 3 to be restored with no looseness in the inoperative condition due to the biasing force of the double torsion spring 15 while, at the same time, causing the right and left latches 5, 5 to rotate in the reverse direction to cause the distal ends of the latches 5, 5 to protrude into the associated lock apertures Pa, Pa again by the biasing forces of the compression springs 6, 6.

In contrast, in order for the opened glove box body B to be restored to its closed condition, the glove box body B is lifted up into the cavity of the instrument panel P. When this takes place, the tapered surfaces 5a, 5a formed at the respective right and left latches 5, 5 and protruding toward the corresponding lock apertures Pa, Pa are caused to abut the instrument panel P which is formed with the opposing lock apertures Pa, Pa to compel the respective right and left latches 5, 5 to move rearward against the biasing forces of the compression springs 6, 6 for thereby engaging the associated lock apertures Pa, Pa again. This results in the glove box body B remaining in the closed position. When this occurs, also, since only the respective right and left latches 5, 5 are caused to retract on the connecting bar 7 regardless of the operation of the operating handle 3, there is no probability for the operating handle 3 per se to remain in an operative condition, thus providing an improved aesthetic styling of the storage bin and the associated side lock assembly.

Consequently, with the side lock assembly of the first preferred embodiment set forth above, when it is required for the amounts of protrusions of the respective latches 5, 5 to be altered because of designing the shapes of the instrument panel, serving as the support body, and the glove box body B, serving as the storage bin, there is no need for the side lock assembly to be widely modified in structure as required in the state-of-the-art practice. Mere modifications in the sloped cam surfaces 12, 12 and the length of the respective latches 5, 5 provide capabilities of meeting demands for alterations in the amount of protrusions in an extremely reasonable practice while the capability of altering the length of each latch in a laterally axial direction provides no need for alteration in the size of the housing 8.

While the preferred embodiment has been set forth above with reference to a structure in which the right and left latches 5, 5 are formed with the latch release member including the sloped cam surfaces 12 serving as the cam elements, which are formed to face in the rotational direction of the respective latches and adapted to remain in sliding contact with the associated upper cut-out portions 16a, 16a of the opposing first and second blocks 6, 6 of the housing 8, on the contrary, it is an arbitrary practice to provide an alternative structure in which the opposing first and second blocks 6, 6 of the housing 8 are formed with cam elements, corresponding to the sloped cam surfaces 12, 12, to be brought into sliding contact with corresponding suitably contoured portions of the right and left latches 5, 5 to perform the same function.

Second Preferred Embodiment

Now, a side lock assembly SLB of a second preferred embodiment is described below in detail with reference to FIGS. 7 to 11. Also, the same component parts as those of the first preferred embodiment bear the same reference numerals as those therein.

Figure 7:
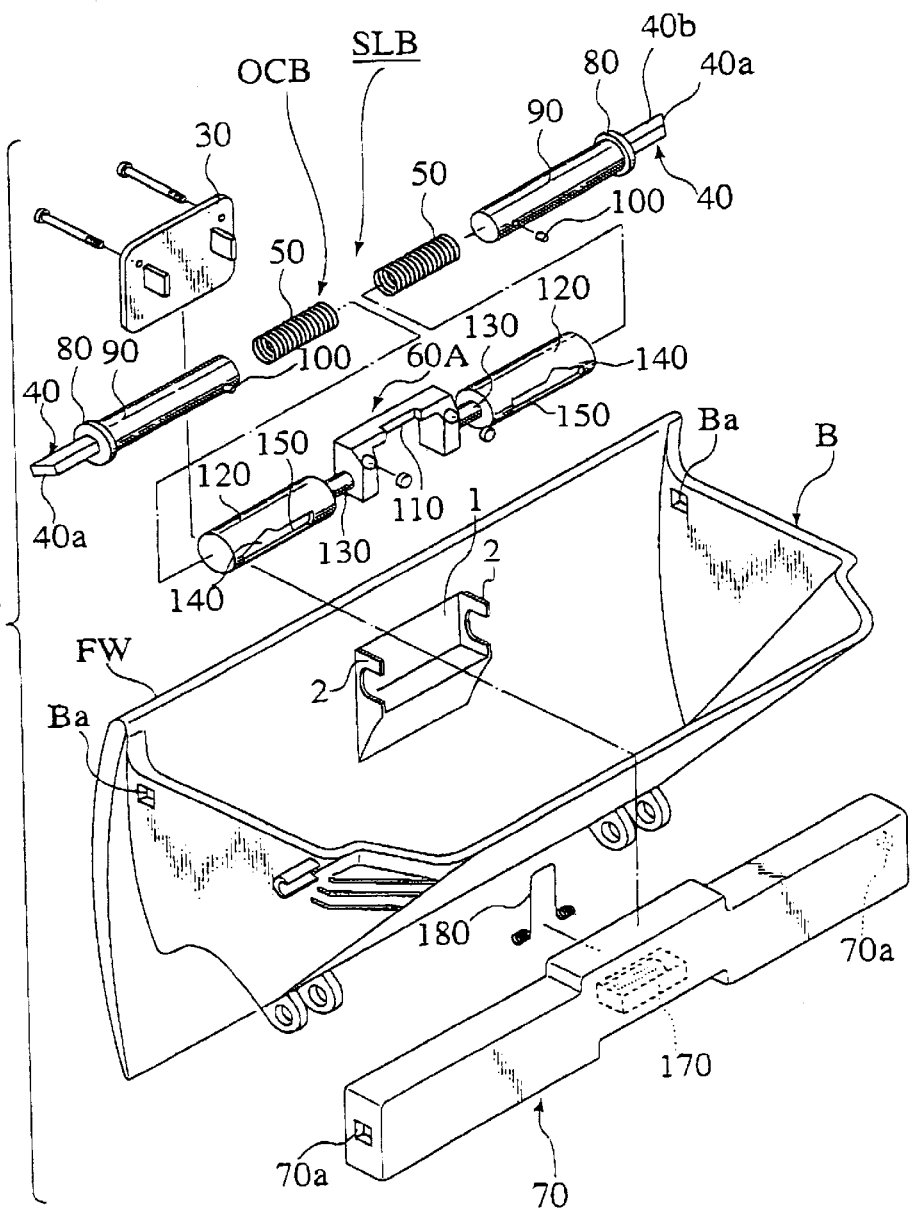
FIG. 7 is an exploded perspective view of a side lock assembly of a second preferred embodiment according to the present invention.

As shown in FIG. 7, in an exemplary structure of the second preferred embodiment, the central portion of the front wall FW of the glove box body B includes the through-bore 1, formed therein having lateral opposing edges formed with the inwardly extending shaft receptor segments 2, 2, in which an operating handle 30, forming pan of an opening closing mechanism OCB of a side lock assembly SLB, is pivotally mounted and is fixed to a base portion 110 of a rotatable shaft 60A by screws as will be described below. The sotatable haft 60A serves as a rotatable connecting member which is integrally rotatable with the operating handle 30 to move selectively between a locked position and an unlocked position. A housing 70 is fixed to the storage bin B at the inside thereof to encompass a latch member composed of a pair of right and left latches 40, 40, two compression springs 50, 50 which bias the right and left latches 40,40 toward the locked positions, respectively, and the rotatable shaft 60A.

In a second exemplary embodiment, each latch 40 is symmetrical in nature relative to one another In view of the symmetrical nature of the latch 40 and for a simplified description, a single latch 40 will be described below in detail. The latch 40 is made of plastic resin formed in a unitary structure and, as shown, the latch 40 includes a rectangular bar shaped portion 40b formed with a tapered distal end portion 40a serving as a cam element of a latch release member, an enlarged flange 80 integrally formed at a rear end of the rectangular bar portion 40b, and a sleeve portion 90 integrally extending rearward from the enlarged flange 80 and carrying thereon a cam pin 100 that also serves as a cam element forming another part of the latch release member and laterally extends in a plane perpendicular to a rotational axis of the rotatable shaft 60A The bar shaped portion 40b of the latch 40 protrudes outward through a side aperture 70a of a housing 70, and the sleeve portion 90 is inserted through an associated guide sleeve 120 of the rotatable shaft 60A for lateral sliding movements, along the rotational axis thereof, which is described below in detail. Then, the sleeve portion 90 is biased toward a lock aperture formed in the instrument panel by the biasing force of a compression spring 50 disposed in the guide sleeve 120 of the rotatable shaft 60A.

The rotatable shaft 60A is made of plastic resin in a unitary structure and includes the base portion 110 which fixes the above-described operating handle 30 in a place, and the pair of guide sleeves 120, 120 connected to both ends of the base portion 110 via axle portions 130. The pair of guide sleeves 120, 120 are formed with cam recesses 140, 140, respectively, which serve as cam elements of the latch release member to engage the cam pins 100, 100 fixed to the sleeve portions 90, 90 of the respective latches 40, 40, respectively. It is arranged such that, during rotation of the rotatable shaft 60A per se caused by torque obtained by pivotal movement of the operating handle 30 exerted with an external unlocking force, the cam pins 100 are caused to move along the respective edges of the associated cam recesses 140, 140, thereby compelling the respective latches 40, 40 to move rearward along the rotational axis of the rotatable shaft 60A to retract from the associated lock apertures against the biasing forces of the compression springs 50, 50.

The above-described cam recesses 140, 140 are symmetrical in nature relative to one another and, when the cam pins 100, 100 remain at the outermost positions of the respective edges of the cam recesses 140, 140, the distal ends of the respective latches 40, 40 protrude through the associated lock apertures of the instrument panel. On the contrary, in the course of rotation of the rotatable shaft 60A, if the cam pins 100, 100 remain at the respective rearward positions of the respective edges of the cam recesses 140, 140, the respective latches 40, 40 are retracted from the associated lock apertures of the instrument panel. With the structure of the second preferred embodiment, the cam sleeves 120, 120 are formed with laterally extending escape recesses 150, 150, respectively, to be contiguous with the cam recesses 140, 140 to allow the associated cam pins 100, 100 of the latches 40, 40 to move into these escape recesses 150, 150, respectively.

The housing 70 is formed of plastic resin in a unitary structure and, as shown in FIG. 7, has a central portion provided with a block 170 to which a double torsion spring 180 is mounted to allow the base portion 110 of the rotatable shaft 60A to abut the block 170 for biasing the operating handle 30 in an inoperative condition with no looseness, with both distal ends of the blocks 170, 170 being formed with the opposing rectangular side apertures 70a, 70a, respectively, to permit the distal ends of The respective latches 40, 40 to be inserted.

Figure 8:
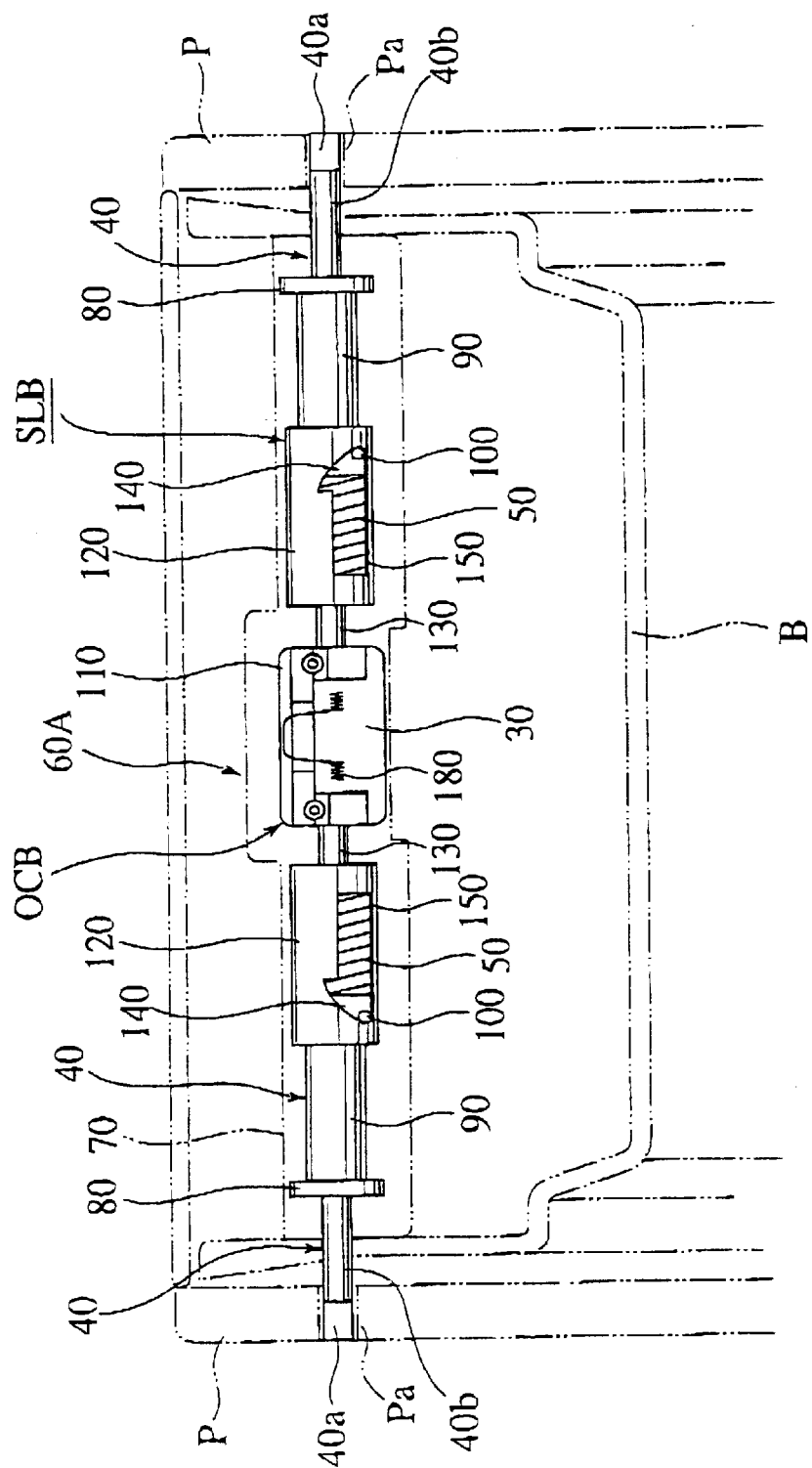
FIG. 8 is a view illustrating a glove box body which remains in a closed, locked condition with the side lock assembly shown in FIG. 7.
Figure 9:
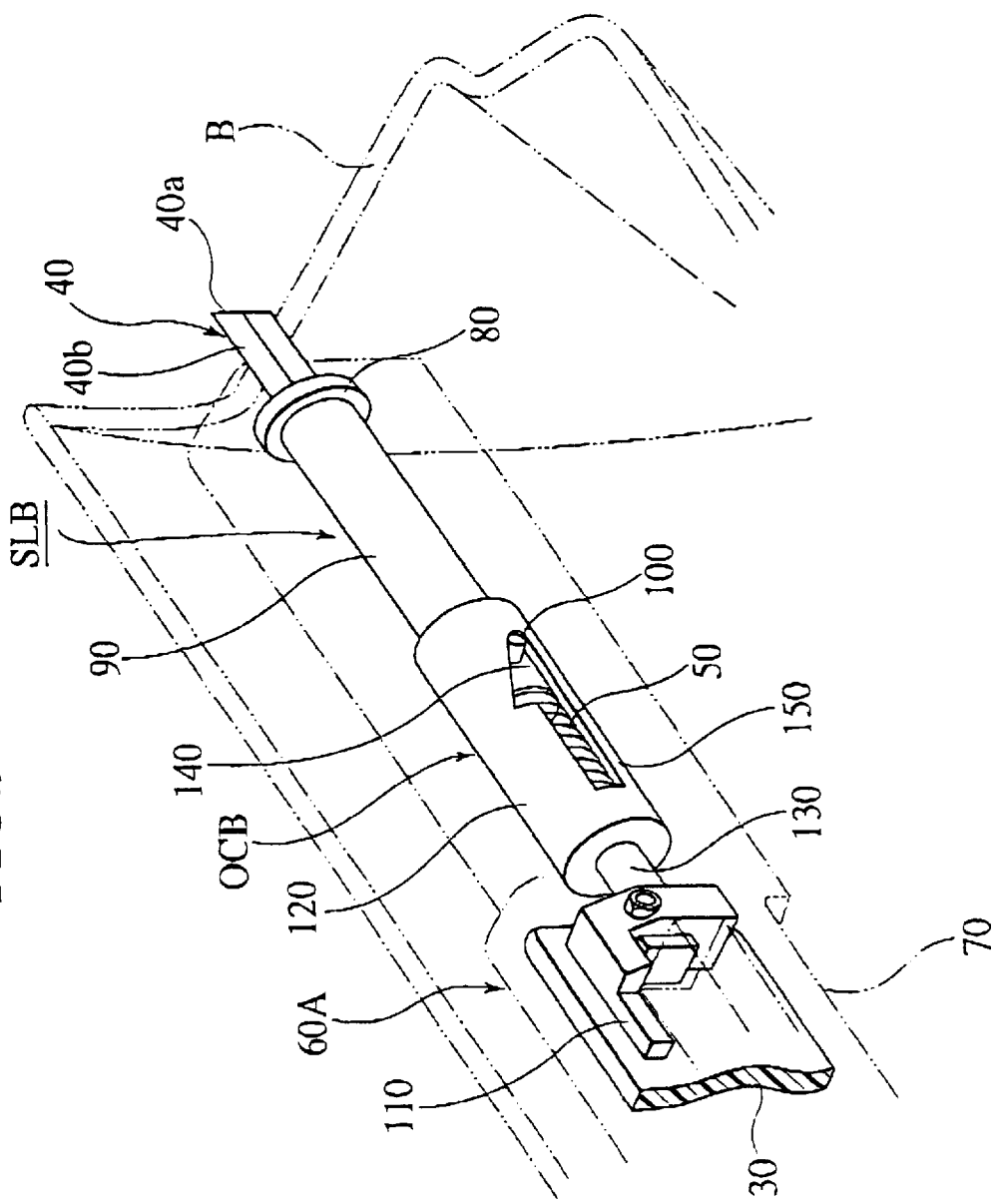
FIG. 9 is a perspective view illustrating an essential part of the glove box body which remains in a closed, locked condition with the side lock assembly shown in FIG. 7.

With such a structure of the side lock assembly SLB, as shown in FIGS. 8 and 9, during the closed condition of the glove box body B, the opposing distal ends of the pair of right and left latches 40, 40 extend through opposing lock apertures Pa, Pa of the instrument panel P via the associated side apertures 70a, 70a of the housing 8 and via the opposing rectangular through-holes Ba, Ba formed at opposing side walls of the glove box body B, and engage the associated lock apertures Pa, Pa of the instrument panel P by the biasing forces of the compression springs 50, 50 disposed in the respective guide sleeves 120, 120 of the rotatable shaft 60A In such a closed condition, the glove box body B is locked in a closed position. As a result of the glove box body B remaining in the closed condition, the latches 40, 40 in the form of respective rectangular bar shaped portions 40b, 40b are held in mating engagement with the above-described side apertures 70a, 70a and the rectangular through-holes Ba, Ba. As such, rotations of the right and left latches 40, 40 are restricted.

Figure 10:
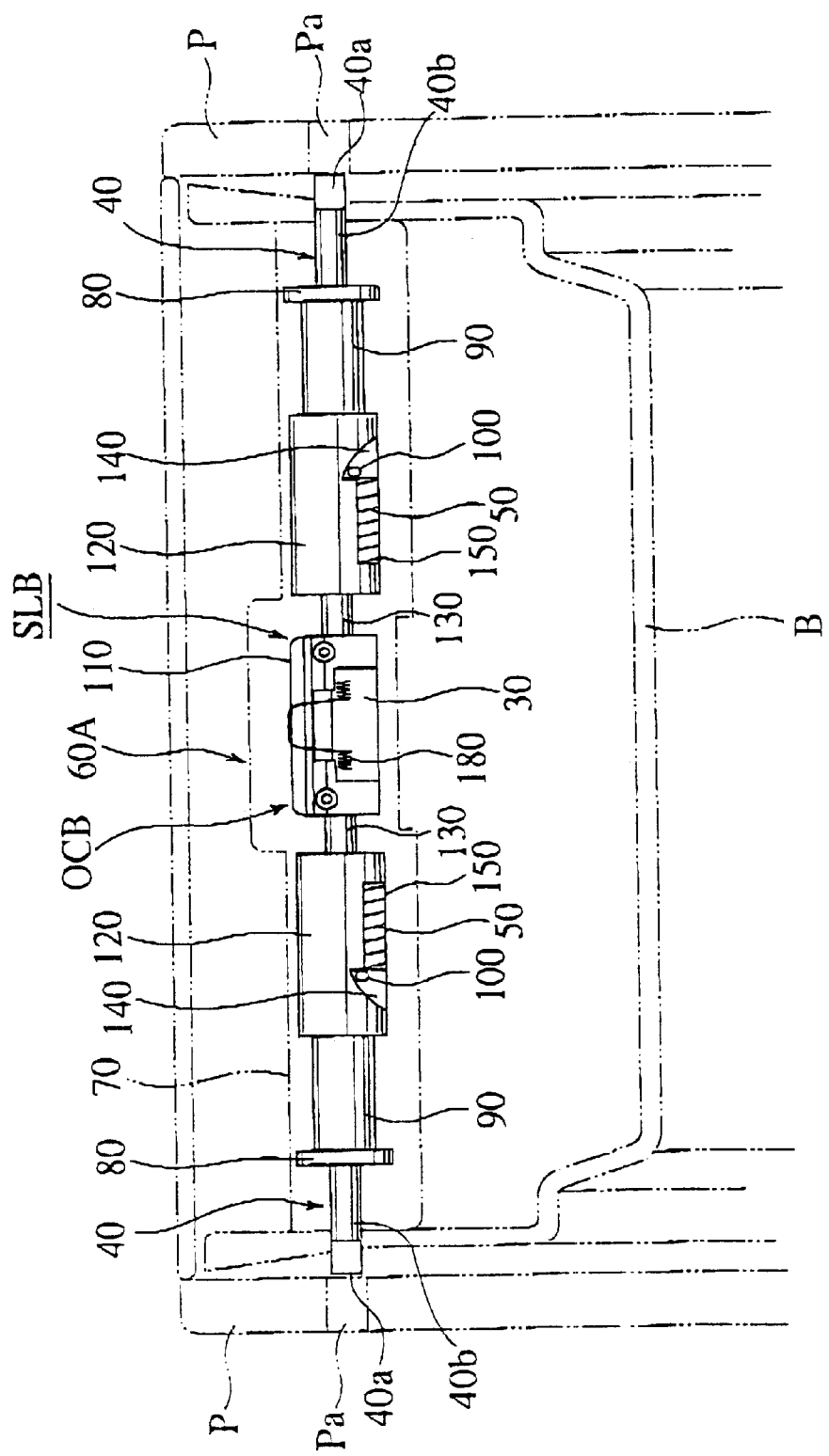
FIG. 10 is a perspective view illustrating the glove box body which remains in an unlocked condition with the side lock assembly shown m FIG. 7.
Figure 11:
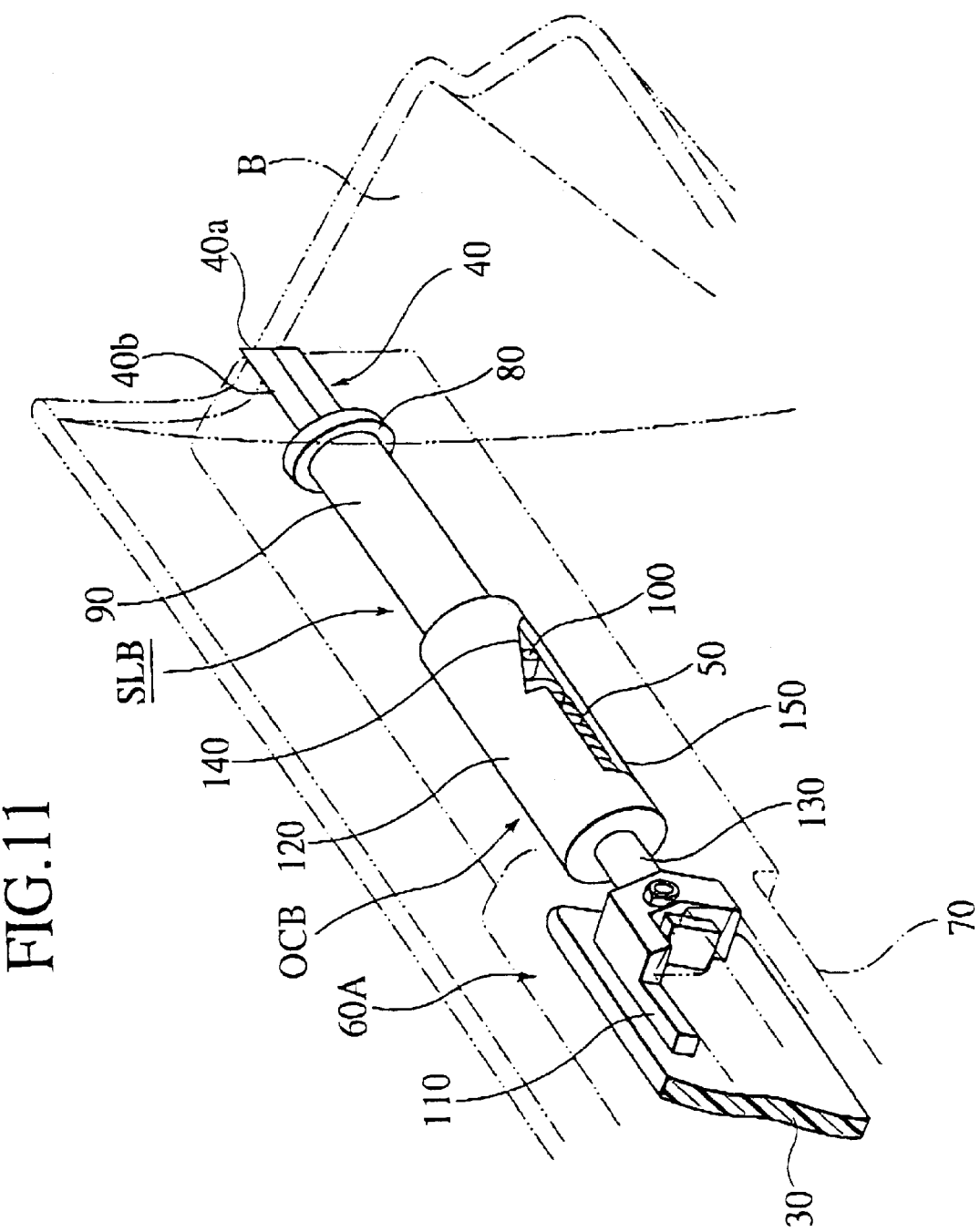
FIG. 11 is a perspective view illustrating an essential part of the glove box body which remains in the unlocked condition.

As shown in FIGS. 10 and 11, in order for the locked glove box body B to be operated in an open, unlocked direction, the operating handle 30 is pivotally operated with an external unlocking force exerted thereto against the biasing force of the double torsion spring 180. When this takes place, since pivotal movement of the operating handle 30 effectuates an accompanied rotation of the rotatable shaft 60A, the cam pins 100, 100, which engage the associated cam recesses 140, 140, respectively, of the rotatable shaft 60A, move rearward along the cam edges of the associated cam recesses 140, 140, thereby causing the right and left latches 40, 40 to be forcibly retracted rearward against the biasing forces of the compression springs 50, 50.

Then, as a result of respective right and left latches 40, 40 being forcibly retracted, the distal ends of the right and left latches 40, 40 are also caused to retract from the associated lock apertures Pa, Pa of the instrument panel P and, subsequently, the glove box body B is allowed to automatically rotate to its opened position. If the operating handle 30 is released after the glove box body B has been rotated to its opened position, the cam pins 100, 100 move in the associated cam recesses 140, 140 along the cam edges thereof by the biasing forces of the compression springs 50, 50 to rotate the rotatable shaft 60A in the reverse direction while, at the same time, compelling the operating handle 30 to be restored with no looseness in the inoperative condition by the biasing force of the double torsion spring 180. Also, the distal ends of the right and left latches 40, 40 are caused to protrude through the associated lock apertures Pa again by the biasing forces of the compression springs 50, 50.

In contrast, in order for the opened glove box body B to be restored to its closed condition, the glove box body B is rotated toward the cavity of the instrument panel P. When this takes place, the tapered surfaces 40a, 40a, which form cam elements of the latch release member and are formed at the respective right and left latches 40, 40 and protrude toward the corresponding lock apertures Pa, Pa are caused to abut the associated surfaces of the instrument panel P, formed with the opposing lock apertures Pa, Pa, to compel the respective right and left latches 40, 40 to move rearward against the biasing forces of the compression springs 50, 50 wherreupon the right and left latches 40, 40 are brought into engagement with the associated lock apertures Pa, Pa again. This permits the glove box body B to be held in the closed position. When this occurs, also, since only the respective right and left latches 40, 40 are caused to retract rearward in the associated guide sleeves 120, 120 of the rotatable shaft 60A regardless of the operation of the operating handle 30, there is no probability for the operating handle 30 per se to remain in an operative condition, thus providing an improved aesthetic styling of the storage bin and the associated side lock assembly.

Consequently, with the side lock assembly SLB of the second preferred embodiment set forth above, when it is required for the amounts of protrusions of the respective latches 40, 40 to be altered because of designing the shapes of the instrument panel, serving as the support body, and the glove box body B serving as the storage bin, there is no need for the side lock assembly to be widely modified in structure as required in the state-of-the-art practice. Merely slight modifications in the length of the respective cam recesses 140, 140 and the latches 40, 40 are able to meet such a demand in an extremely reasonable practice while enabling to provide the capability of altering the length of the components in a laterally axial direction without the need for alteration in the size of the housing 70.

Third Preferred Embodiment

Now, a side lock assembly SLC of a third preferred embodiment is described below in detail with reference to FIGS. 12 to 18. The third preferred embodiment fundamentally follows the second preferred embodiment set forth above. Between these preferred embodiments, a differential feature exists in that the third preferred embodiment has a structure in which the right and left latches 40, 40 are formed with cam recesses 140, 140 forming cam elements of the latch release element and a rotatable sleeve member 60B serving as a rotatable connecting member is provided with a pair of cam projections 100, 100, which also form cam elements of the latch release member, adapted to move along cam edges of the associated cam recesses 140, 140. Also, in the third preferred embodiment, the double torsion spring 180 for biasing the operating handle 30 toward the inoperative condition is dispensed with. Thus, the like component parts as those of the second preferred embodiment bear the same reference numerals to omit a redundant description.

Figure 12:
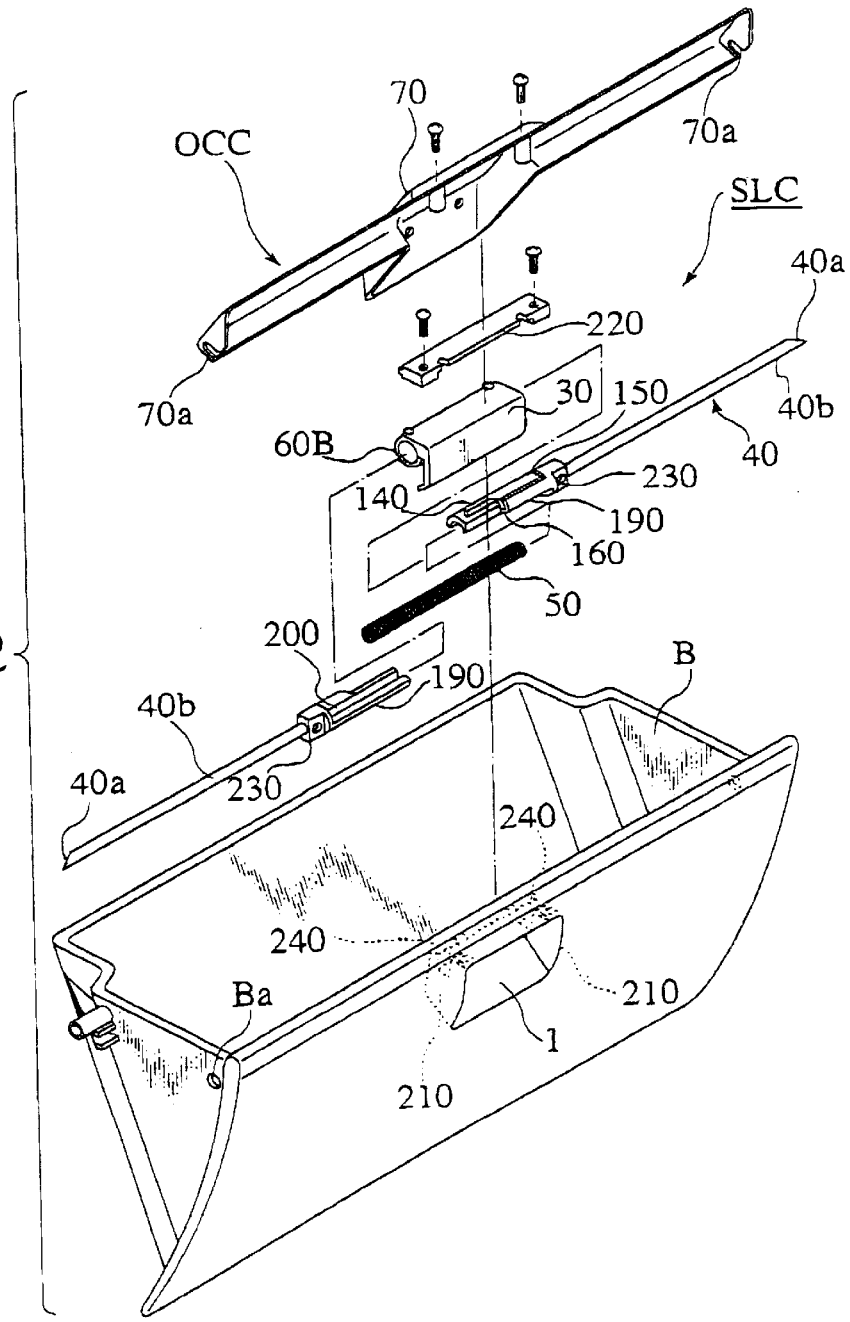
FIG. 12 is an exploded perspective view of a side lock assembly of a third preferred embodiment according to the present invention.
Figure 13:
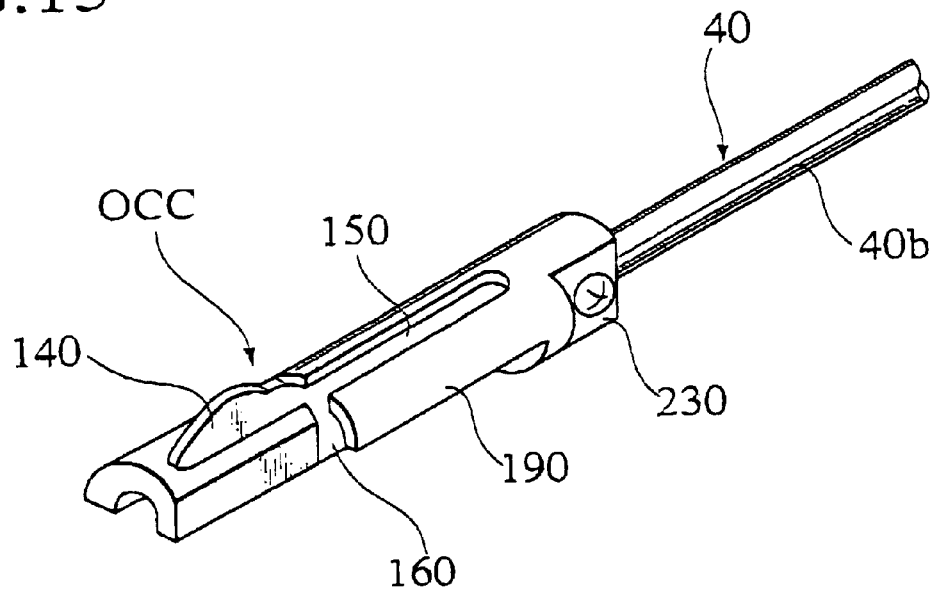
FIG. 13 is an enlarged perspective view illustrating the relationship among a cam recess, an escape recess and a cut-out recess of a latch forming part of the side lock assembly shown in FIG. 12.

As shown in FIGS. 12 and 13, more particularly, the right and left latches 40, 40 take the form of round type elongated bar members longer than those of the second preferred embodiment, with rear end portions of the latches 40, 40 being integrally formed with opposing cam guide portions 190, 190, respectively, each formed in a half sleeve, whose front walls are formed with cam recesses 140, 140. Further, inner walls of the cam guide portions 190, 190 are formed with respective convex segments 200, 200 for retaining distal ends of the compression springs 50, 50. Thus, the half sleeve shaped opposing cam guide portions are mated with one another to form a cylindrical member, in which a single compression spring 50 is disposed for biasing the right and left latches 40, 40 toward the lock apertures Pa of the instrument panel P along the rotational axis of the rotatable sleeve 60B. Also, the third preferred embodiment features the provision of the cam recesses 140, 140 each of which includes a cut-out recess 160, in addition to the laterally extending escape recess 150 of the second preferred embodiment, for guiding the cam pin 100 into the cam recess 140.

Figure 14:
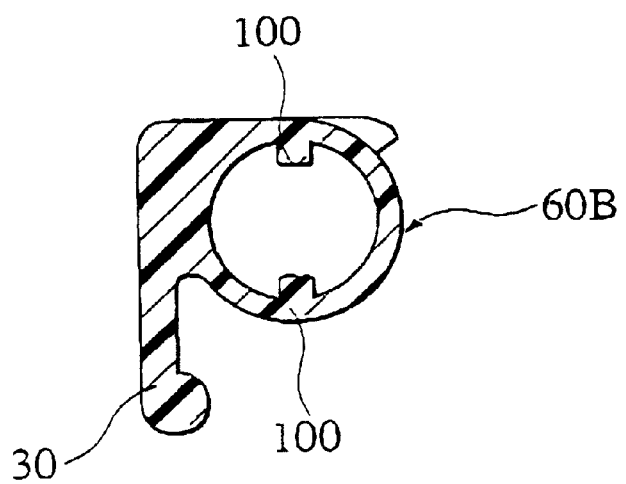
FIG. 14 is a cross sectional view illustrating the relationship among an operating handle, a rotatable sleeve member and cam pins which form part of the side lock assembly shown in FIG. 12.

Further, as shown in FIGS. 12 and 14, the rotatable sleeve 60B includes a sleeve boy with a size to accommodate the half sleeve shaped cam guide portions 190, 190 therein to form the above-described cylindrical configuration. Furthermore, the rotatable sleeve 60B is integrally formed with the operating handle 30 and has an inner peripheral wall formed with the pair of opposing cam pins 100, 100 radially extending inward to engage the cam recesses 140, 140 via the cut-out recesses 160, 160. The opposing cam projections 100, 100 also serve as cam elements of the latch release member as will be described in detail. In addition, the rotatable sleeve member 60B is arranged to be pivotally supported in the through-bore 1 of the glove box body B at bearing portions 210, 210 formed at the rear side of the glove box body B for pivotal movements with the operating handle 30, with a top plate 220 being fixedly secured to the rotatable sleeve member 60B by means of screws. It is to be noted here that the rotatable sleeve member 60B may be separately formed from the operating handle 30 in separate pieces which are subsequently fixedly secured to one another by some suitable expedients.

In the third preferred embodiment, further, the housing 70 is formed in a size and shape designed to encompass the pair of latches 40, 40 and the rotatable sleeve 60B which have been set forth above. To this end, the housing 70 is formed at its both ends with side apertures 70a, 70a of respective cut-out profiles to permit insertion of front distal ends of the right and left latches 40, 40. In this connection, in the third preferred embodiment, the cam guide portions 190, 190 have front ends formed with generally rectangular portions 230, 230, respectively, adjacent the latches 40, 40, and opposing associated concave shoulders 240, 240 are formed at both sides of the bearing portions 210. Causing the rectangular portions 230, 230 to rest on the associated concave shoulders 240, 240 restricts the rotations of the right and left latches 40, 40. As a consequence, the through-holes Ba, Ba of the glove box body B are formed in round shapes.

With such a structure of the third preferred embodiment, in order for the right and left latches 40, 40 to be assembled with the rotatable sleeve member 60B integrally formed with the operating handle 30, the single compression spring 50 is inserted to the cam guide portion 190. Then, the cam guide portions 190, 190 connected to the respective right and left latches 40, 40 are mated to one another into one piece, which in turn is inserted To the rotatable sleeve member 60B. Subsequently, rotating the rotatable sleeve 60B allows the pair of cam projections 100, 100, inwardly protruding from the inner periphery of the rotatable sleeve member 60B, to be guided to the associated cam recesses 140, 140 through the respective cut-out recesses 160, 160 such that the respective right and left latches 41), 40 are supported in the rotatable sleeve member 60B for protruding and retracting movements.

Figure 15:
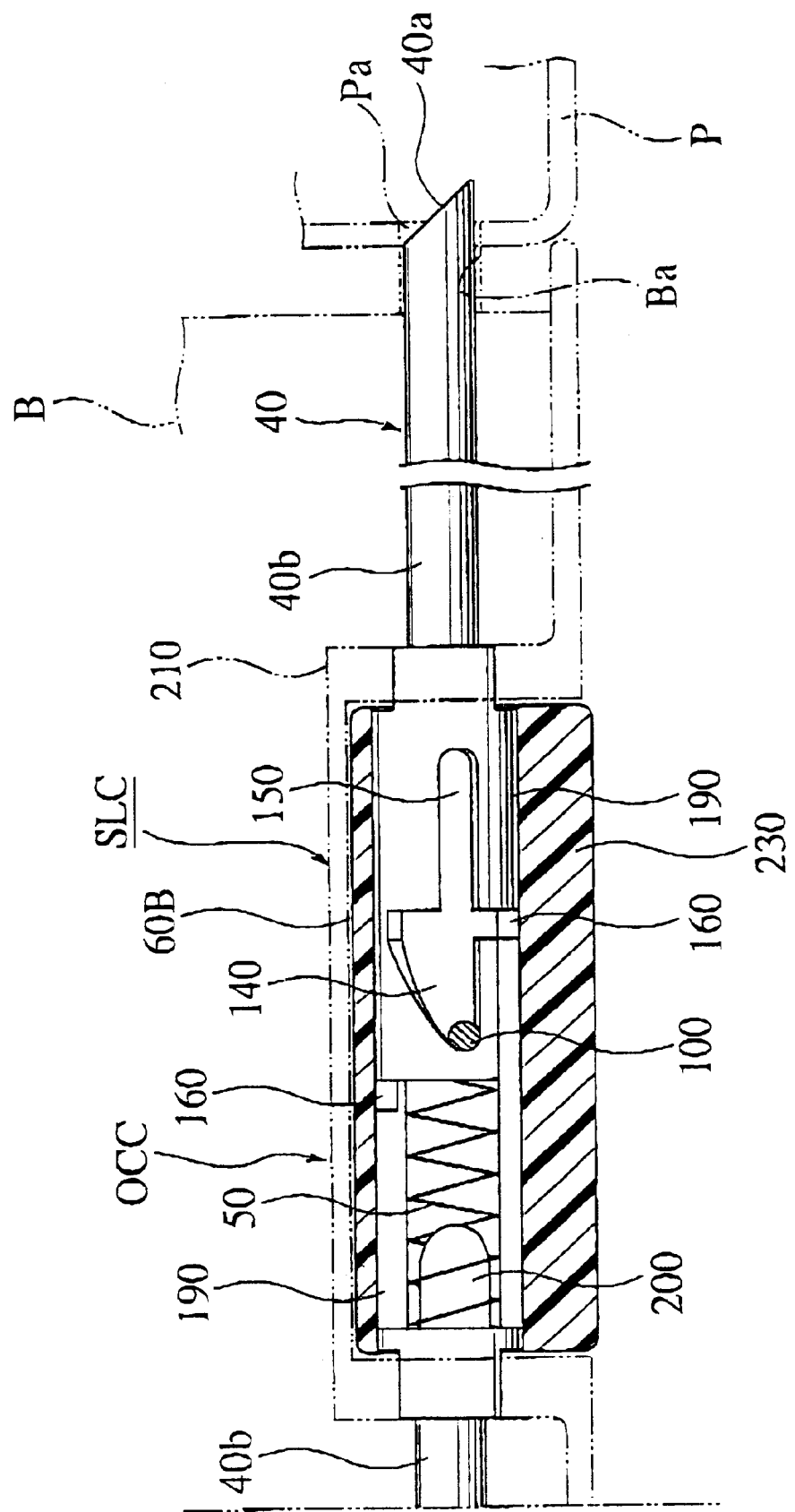
FIG. 15 is an enlarged view, partially in cross section, of a glove box body which remains in a closed, locked condition with the side lock assembly shown in FIG. 12.
Figure 16:
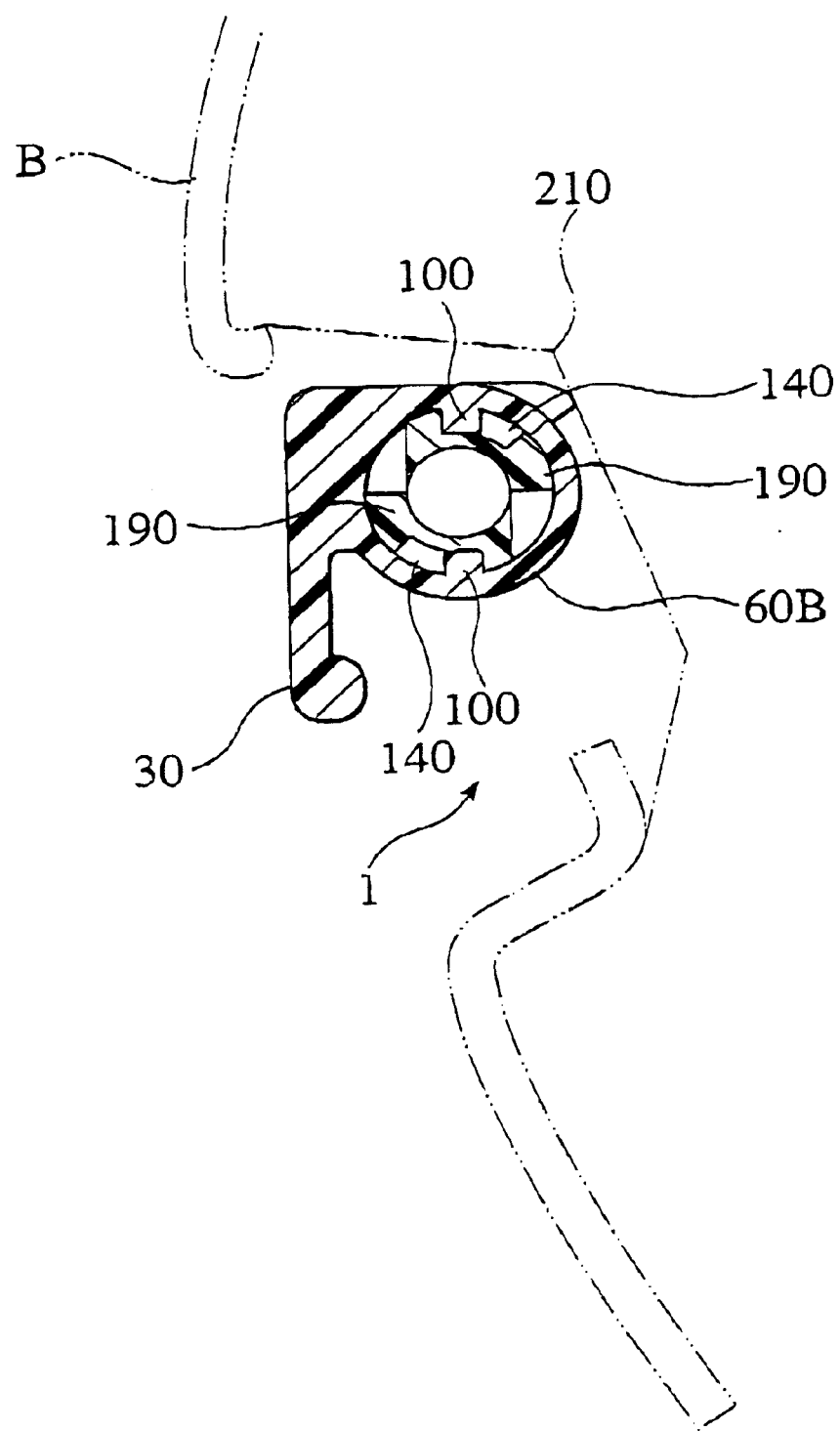
FIG. 16 is an enlarged view, partially in cross section, illustrating the relationship between the cam recess and the cam pin of the glove box body which remains in the closed, locked condition with the side lock assembly shown in FIG. 12.

As shown in FIG. 15, when the glove box body B remains in its closed condition, the distal ends of the respective right and left latches 40, 40 engages the associated lock apertures Pa, Pa of the instrument panel P through the associated round through-holes Ba, Ba, formed at the opposing side walls of the glove box body B and through the cut-out shaped side apertures 70a, 70a of the housing 70 by the compression force of the compression spring 50 internally mounted to the cam guide portions 190, 190, defined in the single piece of cylindrical configuration, of the respective latches 40, 40. In such a closed condition, the glove box body B is held in the locked position to lock the glove box body B to the support body (instrument panel P). Also, in such a locked state, the operating handle 30 is left in an inoperative condition as shown in FIG. 16.

Figure 17:
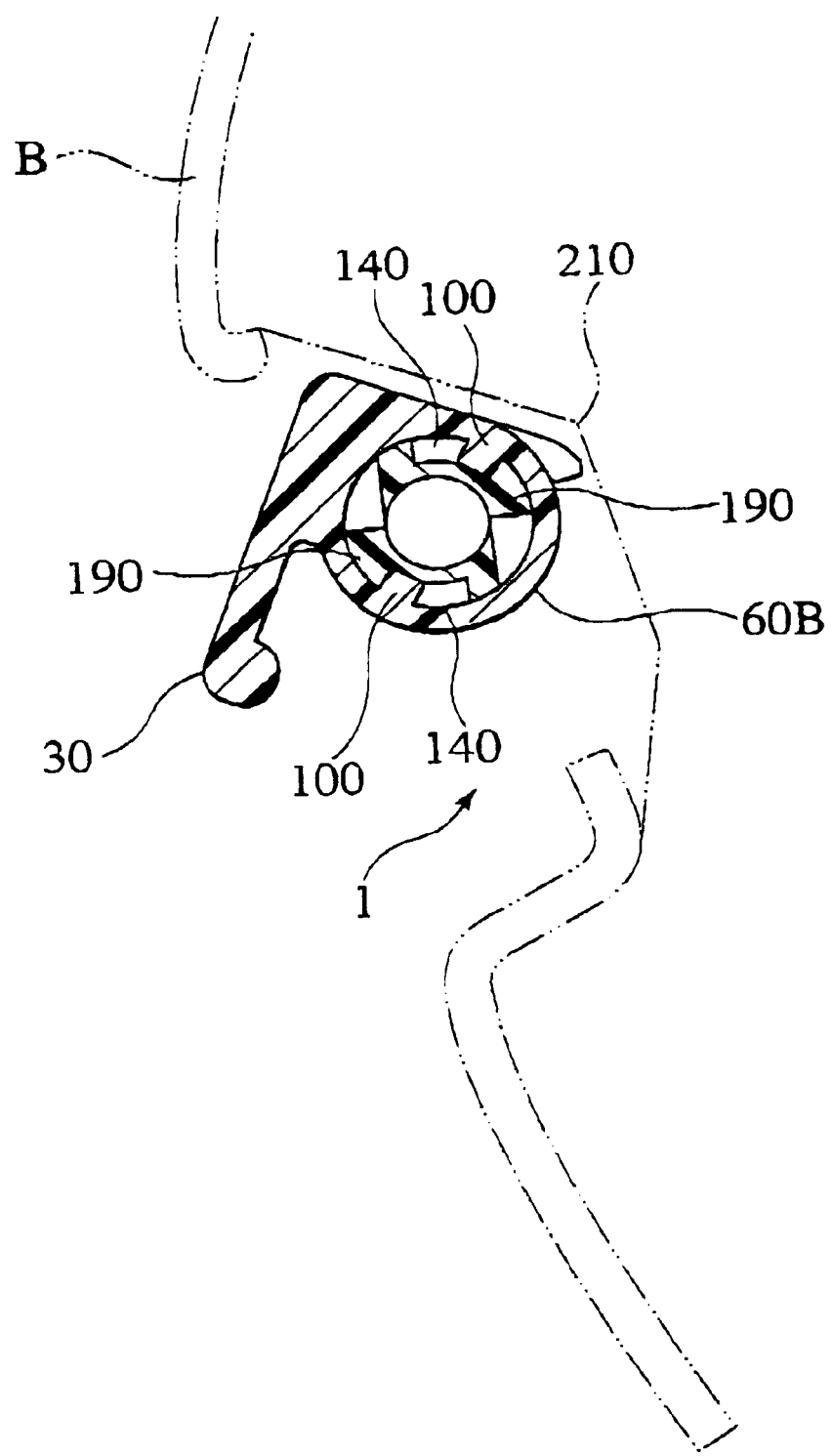
FIG. 17 is an enlarged view, partially in cross section, illustrating the relationship between the cam recess and the cam pin of the glove box body which remains in the unlocked condition with the side lock assembly shown in FIG. 12.

Further, in order for the locked glove box body B to be pivotally rotated in a direction toward an open condition, the operating handle 30 is pivotally rotated clockwise, i.e. in a direction as shown in FIG. 17. As a result of the pivotal rotation of the operating handle 30, the rotatable sleeve member 60B rotates clockwise to cause the cam pins 100, 100 of the rotatable sleeve member 60B to move along the cam edges of the cain recesses 140, 140.

Figure 18:
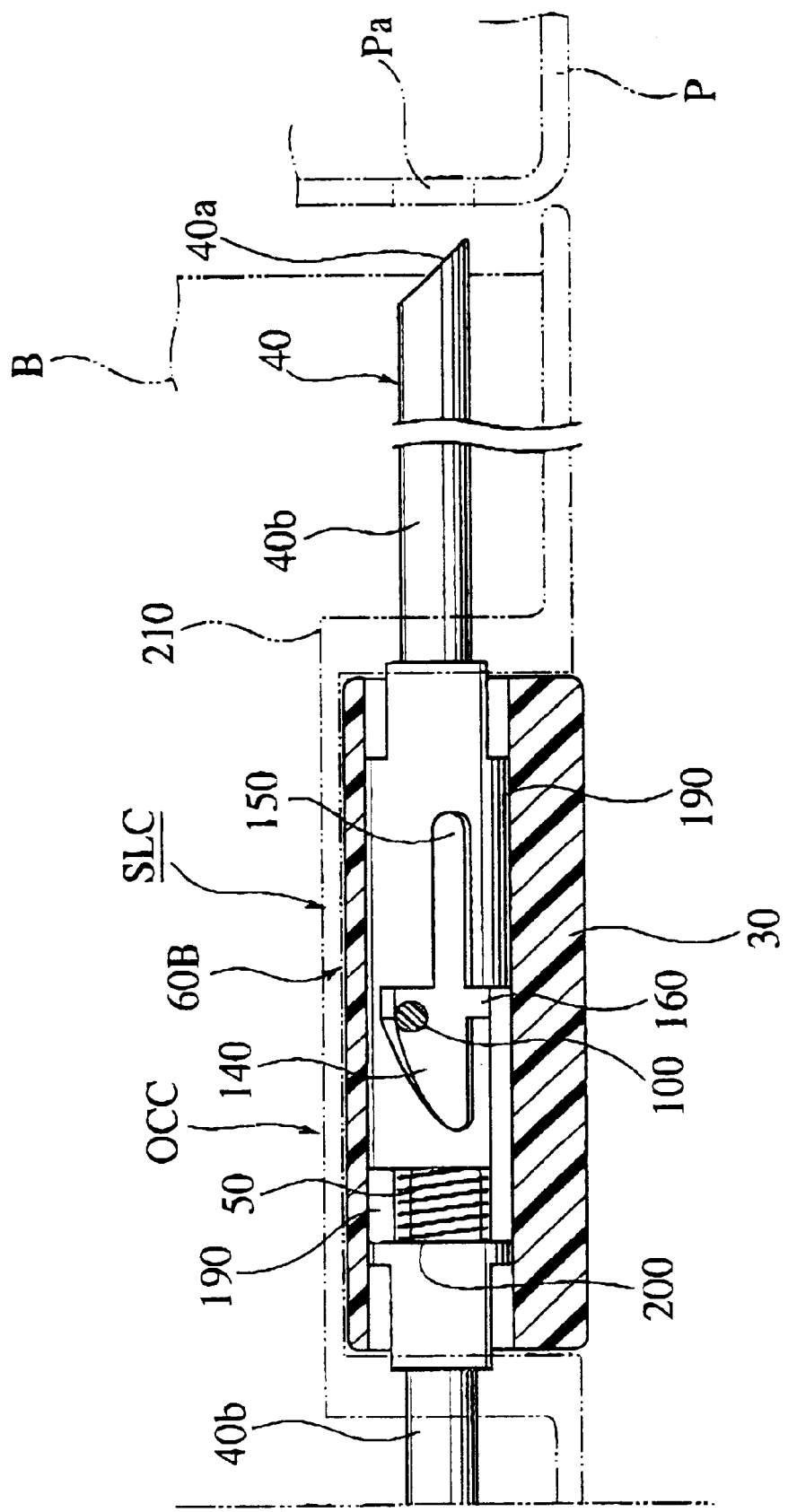
FIG. 18 is an enlarged view, partially in cross section, illustrating an essential part of the glove box body which remains in the unlocked condition with the side lock assembly shown in FIG. 12.

As shown in FIG. 18, this results in the right and left latches 40, 40 being forcibly retracted from the associated lock apertures Pa, Pa of the instrument panel P against the biasing force of the single compression spring 50.

As a result of the right and left latches 40, 40 being forcibly retracted, the distal ends of the right and left latches 40, 40 disengage from the associated lock apertures Pa, Pa of the instrument panel P and, then, the glove box body B is allowed to automatically rotate to its opened condition. If the operating handle 30 is released after the glove box body B has been rotated in the opening direction, the cam projections 100, 100 are shifted in the reverse direction through the associated cam recesses 140, 140 by the biasing force of the compression spring 50. When this takes place) the distal ends of the right and left latches 40, 40 are caused to protrude into the lock apertures Pa, Pa again by the biasing force of the compression spring 50 while, at the same time, permitting the rotatable sleeve member 60B to rotate in the reverse direction to restore the operating handle 30 in its inoperative condition.

In contrast, in order for the opened glove box body B to be restored to its closed condition, the glove box body B is rotated toward the cavity of the instrument panel P.

When this takes place, the tapered surfaces 40a, 40a, which form cam elements of the latch release member and are formed at the respective right and left latches 40, 40 and protrude toward the corresponding lock apertures Pa, Pa are caused to abut the associated surfaces of the instrument panel P, formed with the opposing lock apertures Pa, Pa, to compel the respective right and left latches 40, 40 to move rearward against The biasing forces of the compression springs 50, 50 whereupon the right and left latches 40, 40 are brought into engagement with the associated lock apertures Pa, Pa again. This permits the glove box body B to be held in the closed position. When this occurs, also, since only the respective right and left latches 40, 40 are caused to retract rearward within the associated guide sleeves 120, 120 of the rotatable sleeve member 60B regardless of the operation of the operating handle 30, there is no probability for the operating handle 30 per se to remain in an operative condition, thus providing an improved aesthetic styling of the storage bin and the associated side lock assembly.

Consequently, with the side lock assembly SLC of the third preferred embodiment set forth above, when it is required for the amounts of protrusions of the respective latches 40, 40 at both sides thereof to be altered because of designing the shapes of the instrument panel, serving as the support body, and the glove box body B serving as the storage bin, like in the second preferred embodiment, there is no need for the side lock assembly to be widely modified as required in the state-of-the-art practice by merely implementing slight modifications in the length of the respective cam recesses 140, 140 and the latches 40, 40, providing a capability of meeting such a demand in an extremely reasonable practice. Also, the presence of the capability of altering the length of the components in a laterally axial direction provides no need for alteration in the size of the housing 70.

In addition, with the third preferred embodiment set forth above, since the cam recesses 140, 140 are directly formed on the latches 40, 40, respectively, it is only required for only the latches 40, 40 to be altered, resulting in a further reasonable improvement Further, the presence of the capability of employing the single compression spring 50 serving as a biasing member provides a space saving capability while, since the cam pins 100, 100 engage the associated cam recesses 140, 140 of the right and left latches 40, 40 within the interior of the rotatable sleeve member 60B with the cylindrical shape, the cam projections 100, 100 and the cam recesses 140, 140 are maintained in a stabled mutual engagement condition.

What is claimed is:

1. A side lock assembly, for locking a storage bin to a support body, comprising:
    a support body;
    a storage bin received in the support body; and
    an opening and closing mechanism operatively mounted on the storage bin for operating the storage bin in a locked position and an unlocked position relative to the support body, the opening and closing mechanism including;
        an operating member pivotally mounted on the storage bin to move selectively between the locked position and the unlocked position;
        a rotatable connecting member integrally rotatable with the operating member to move selectively between the locked position and the unlocked position;
        a latch member engaged to or disengaged from the support body through the storage bin, the latch member being movable inward along a rotational axis of the rotatable connecting member and normally biased outward to lock the storage bin to the support body in the locked position; and
        a latch release member having one element connected to the latch member and another element connected to the rotatable connecting member to apply an axial force to the latch member, the latch release member being operative to move the latch member inward along the rotational axis against the axial force to disengage the latch member from the support body in the unlocked position in response to an unlocking external force applied to the operating member,
    wherein the latch member includes a pair of latches, and the rotatable connecting member includes a connecting bar having a central portion operatively connected to the operating member to be integrally movable therewith and distal ends operatively connected to the pair of latches for pivotal and sliding movements thereof.

2. The side lock assembly according to claim 1, further comprising a housing fixed to the storage bin to encompass the pair of latches and the connecting bar to permit pivotal and lateral sliding movements of the pair of latches and pivotal movement of the connecting bar.

3. The side lock assembly according to claim 2, wherein the latch release member includes a pair of first cam elements disposed in the housing and a pair of second cam elements connected to the latches, respectively, to selectively engage or disengage the first cam elements, respectively, to allow the lateral movement of the pair of latches along the rotational axis.

4. A side lock assembly for locking a storage bin to a support body, comprising:
    a support body;
    a storage bin received in the support body; and
    an opening and closing mechanism operatively mounted on the storage bin for operating the storage bin in a locked position and an unlocked position relative to the support body, the opening and closing mechanism including:
        an operating member pivotally mounted on the storage bin to move selectively between the locked position and the unlocked position;
        a rotatable connecting member integrally rotatable with the operating member to move selectively between the locked position and the unlocked position;
        a latch member engaged to or disengaged from the support body through the storage bin, the latch member being movable inward along a rotational axis of the rotatable connecting member and normally biased outward to lock the storage bin to the support body in the locked position;
        a latch release member having one element connected to the latch member and another element connected to the rotatable connecting member to apply an axial force to the latch member, the latch release member being operative to move the latch member inward along the rotational axis against the axial force to disengage the latch member from the support body in the unlocked position in response to an unlocking external force applied to the operating member; and
        at least one spring member cooperating with the rotatable connecting member and normally biasing the latch member toward the support body along the rotational axis of the rotatable connecting member to lock the storage bin to the support body in the locked position,
    wherein the latch member includes a pair of latches, and the rotatable connecting member includes a rotatable shaft having a base portion fixed to the operating member and pivotally supported with the storage bin for integral pivotal movement therewith, and a pair of guide sleeves laterally extending from opposing ends of the base portion, and wherein the latch release member includes a pair of first cam elements formed in the guide sleeves, respectively, and a pair of second cam elements connected to the latches, respectively, to selectively engage or disengage the first cam elements, respectively, to allow the lateral movements of the pair of latches along the rotational axis of the rotatable connecting member.

5. The side lock assembly according to claim 4, wherein the spring member includes a pair of compression springs carried by the guide sleeves, respectively, for biasing the pair of latches toward the locked position.

6. The side lock assembly according to claim 4, further comprising a housing fixed to the storage bin to encompass the pair of latches, the base portion and the latch release member to allow movements thereof.

7. A side lock assembly for locking a storage bin to a support body, comprising:

a support body;

a storage bin received in the support body; and an opening and closing mechanism operatively mounted on the storage bin for operating the storage bin in a locked position and an unlocked position relative to the support body, the opening and closing mechanism including:

an operating member pivotally mounted on the storage bin to move selectively between the locked position and the unlocked position;

a rotatable connecting member integrally rotatable with the operating member to move selectively between the locked position and the unlocked position;

a latch member engaged to or disengaged from the support body through the storage bin, the latch member being movable inward along a rotational axis of the rotatable connecting member and normally biased outward to lock the storage bin to the support body in the locked position;

a latch release member having one element connected to the latch member and another element connected to the rotatable connecting member to apply an axial force to the latch member, the latch release member being operative to move the latch member inward along the rotational axis against the axial force to disengage the latch member from the support body in the unlocked position in response to an unlocking external force applied to the operating member; and at least one spring member cooperating with the rotatable connecting member and normally biasing the latch member toward the support body along the rotational axis of the rotatable connecting member to lock the storage bin to the support body in the locked position, wherein the latch member includes a pair of latches, and the rotatable connecting member includes a rotatable sleeve member connected to the operating member for supporting the pair of latches for sliding and rotating movements thereof, and wherein the latch release member includes a pair of first cam elements formed in the rotatable sleeve member, and a pair of cam guide portions extending from the latches, respectively, for pivotal and sliding movements in the rotatable sleeve member and formed with a pair of second cam elements, respectively, to selectively engage or disengage the first cam elements formed in the rotatable sleeve member to allow the lateral movements of the pair of latches.

8. The side lock assembly according to claim 7, wherein the cam guide portions are pivotally and slidably disposed in the rotatable sleeve member and having cam recesses cooperating with the first cam elements.

9. The side lock assembly according to claim 7, wherein the spring member includes a compression spring carried by the rotatable sleeve member for biasing the pair of latches toward the locked position.

10. The side lock assembly according to claim 7, wherein further comprising a housing fixed to the storage bin to encompass the pair of latches and the rotatable sleeve member for free movements thereof.

11. A side lock assembly for locking a storage bin to a support body, comprising:

a support body having a pair of lock apertures;

a storage bin received in the support body; and an opening and closing mechanism operatively mounted on the storage bin for operating the storage bin in a locked position and an unlocked position relative to the support body, the opening and closing mechanism including:

an operating handle pivotally mounted on the storage bin to move selectively between the locked position and the unlocked position;

a rotatable connecting bar integrally rotatable with the operating handle to move selectively between the locked position and the unlocked position;

a pair of latches connected to opposing ends of the rotatable connecting bar for integral rotation therewith, the pair of latches being movable inward along a rotational axis of the rotatable connecting bar;

at least one spring member normally biasing the pair of latches toward the lock apertures of the support body along the rotational axis of the rotatable connecting bar to lock the storage bin to the support body in the locked position; and a latch release member including a cam member connected to at least one of the pair of latches, the cam member being normally inoperative to allow the spring member to bias the pair of latches toward the lock apertures of the support body and operative to move the pair of latches inward along the rotational axis of the rotatable connecting bar against the biasing force of the spring member to disengage the pair of latches from the support body in the unlocked position in response to an external unlocking force applied to the operating handle.

12. A side lock assembly for locking a storage bin to a support body, comprising:

a support body having a pair of lock apertures;

a storage bin received in the support body for a closed condition and an opened condition; and an opening and closing mechanism operatively mounted to the storage bin for operating the storage bin in a locked position and an unlocked position relative to the support body to permit the storage bin to be actuated in the closed condition and the opened condition, respectively, the opening and closing mechanism including;

an operating handle disposed in the storage bin and operative to actuate the opening and closing mechanism in the unlocked position;

a rotatable member integrally movable with the operating handle and operative to move selectively between the locked position and the unlocked position;

a pair of latches connected to the rotatable member for sliding movements along a rotational axis of the rotatable member;

at least one spring member cooperating with the rotatable member to normally bias the pair of latches outward to cause the same to engage the lock apertures of the support body in the locked position; and a latch release member including a cam member cooperating with the pair of latches and the rotatable member, the cam member being normally inoperative to allow the spring member to bias the pair of latches toward the lock apertures of the support body and operative to move the pair of latches inward along the rotational axis of the rotatable member against the biasing force of the spring member to disengage the pair of latches from the support body in the unlocked position in response to an external unlocking force applied to the operating handle, wherein the rotatable member comprises a guide sleeve member which is operatively connected to the pair of latches for sliding movements along the rotational axis of the guide sleeve member, wherein the cam member comprises a first cam element fixed to at least one of the pair of latches, and a second cam element formed on the guide sleeve member, and wherein the first and second cam elements cooperate with one another to normally allow the spring member to cause the pair of latches to engage the lock apertures of the support body for thereby locking the storage bin thereto while permitting the pair of latches to move inward along the rotational axis of the guide sleeve member to disengage from the lock apertures of the support body in the unlocked position in response to an external unlocking force applied to the operating handle.

13. The side lock assembly according to claim 12, wherein the first cam element includes a cam pin carried by at least one of the latches, and the second cam element includes a cam recess formed in the guide sleeve member and operatively engaging the cam pin, and a escape recess extending from the cam recess to allow the associated cam pin to move into the escape recess.

14. A side lock assembly for locking a storage bin to a support body, comprising:

a support body having a pair of lock apertures;

a storage bin received in the support body for a closed condition and an opened condition; and an opening and closing mechanism operatively mounted to the storage bin for operating the storage bin in a locked position and an unlocked position relative to the support body to permit the storage bin to be actuated in the closed condition and the opened condition, respectively, the opening and closing mechanism including:

an operating handle disposed in the storage bin and operative to actuate the opening and closing mechanism in the unlocked position;

a rotatable member integrally movable with the operating handle and operative to move selectively between the locked position and the unlocked position;

a pair of latches connected to the rotatable member for sliding movements along a rotational axis of the rotatable member;

at least one spring member cooperating with the rotatable member to normally bias the pair of latches outward to cause the same to engage the lock apertures of the support body in the locked position; and a latch release member including a cam member cooperating with the pair of latches and the rotatable member, the cam member being normally inoperative to allow the spring member to bias the pair of latches toward the lock apertures of the support body and operative to move the pair of latches inward along the rotational axis of the rotatable member against the biasing force of the spring member to disengage the pair of latches from the support body in the unlocked position in response to an external unlocking force applied to the operating handle, wherein the rotatable member comprises a rotatable sleeve member which is operatively connected to the pair of latches for sliding movements along the rotational axis of the rotatable sleeve member, wherein the cam member comprises a first cam portion formed on at least one of the pair of latches, and a second cam portion formed on the rotatable sleeve member, and wherein the first and second cam portions cooperate with one another to normally allow the spring member to cause the pair of latches to engage the lock apertures of the support body for thereby locking the storage bin thereto while permitting the pair of latches to move inward along the rotational axis of the rotatable sleeve member to disengage from the lock apertures of the support body in the unlocked position in response to an external unlocking force applied to the operating handle.

15. The side lock assembly according to claim 14, wherein the rotatable sleeve member has a cylindrical shape in cross section and is integrally connected to the operating handle, and wherein the first cam portion includes a cam recess formed on an end portion of at least one of latches and a cut-out recess for guiding the second cam portion to the recess of the latches, and a escape recess extending from the cam recess to allow the associated cam pin to move into the escape recess, and the second cam portion includes a pair of cam pins formed at an inner periphery of the rotatable sleeve member and arranged opposite to each other, the end portion of at least one of the latches being slidably received in the rotatable sleeve member and operatively engaging the cam projection.

16. The side lock assembly according to claim 15, wherein the opening and closing mechanism includes a cam guide portion having a front end formed with rectangular portion to restrict the rotations of the latch.

* * * * *

UNITED STATES PATENT AND TRADEMARK OFFICE
CERTIFICATE OF CORRECTION

PATENT NO. : 6,669,243 B2
DATED : December 30, 2003
INVENTOR(S) : K. Katoh et al.

It is certified that error appears in the above-identified patent and that said Letters Patent is hereby corrected as shown below:

Column 14,
Line 14, "movement" should be -- movements --.

Signed and Sealed this

Third Day of August, 2004

JON W. DUDAS
*Acting Director of the United States Patent and Trademark Office*